(12) United States Patent
Park et al.

(10) Patent No.: US 9,804,450 B2
(45) Date of Patent: Oct. 31, 2017

(54) LIQUID CRYSTAL DISPLAY

(71) Applicant: SAMSUNG DISPLAY CO., LTD., Yongin-si, Gyeonggi-do (KR)

(72) Inventors: Kee-Bum Park, Cheonan-si (KR); Dong Hee Shin, Cheonan-si (KR); Kyung Ho Kim, Bucheon-si (KR); Ho Kyung Kim, Gwangju (KR); Yoo Mi Ra, Ansan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/997,305

(22) Filed: Jan. 15, 2016

(65) Prior Publication Data

US 2016/0202571 A1 Jul. 14, 2016

Related U.S. Application Data

(63) Continuation of application No. 14/091,002, filed on Nov. 26, 2013, now Pat. No. 9,239,492.

(30) Foreign Application Priority Data

Jul. 3, 2013 (KR) ........................ 10-2013-0078065

(51) Int. Cl.
*G02F 1/1343* (2006.01)
*G02F 1/1337* (2006.01)
*G02F 1/1362* (2006.01)
*G02F 1/1368* (2006.01)
*G02F 1/139* (2006.01)

(52) U.S. Cl.
CPC ...... *G02F 1/134309* (2013.01); *G02F 1/1368* (2013.01); *G02F 1/1393* (2013.01); *G02F 1/13624* (2013.01); *G02F 1/133707* (2013.01); *G02F 1/134336* (2013.01); *G02F 1/136286* (2013.01); *G02F 2001/134354* (2013.01); *G02F 2001/136218* (2013.01)

(58) Field of Classification Search
CPC ............. G02F 1/1393; G02F 1/133707; G02F 1/136286; G02F 2001/134345
See application file for complete search history.

(56) References Cited

U.S. PATENT DOCUMENTS 7,773,165 B2 8/2010 Sohn et al.
7,834,962 B2 11/2010 Satake et al.
(Continued)

FOREIGN PATENT DOCUMENTS

JP 2009-151204 A 7/2009
JP 2010-128211 A 6/2010
(Continued)

*Primary Examiner* — Thanh-Nhan P Nguyen
(74) *Attorney, Agent, or Firm* — Innovation Counsel LLP

(57) ABSTRACT

Provided is a liquid crystal display capable of reducing a texture by increasing a liquid crystal control ability. The liquid crystal display includes a first electrode and a second electrode facing each other with a liquid crystal layer therebetween. The first electrode includes a horizontal extension forming a boundary between adjacent subregions and a vertical extension connected to the horizontal extension, and the horizontal extension includes a portion which has a largest width at a position proximate to the vertical extension, and which has a smaller width at a position farther from the vertical extension.

23 Claims, 24 Drawing Sheets

(56) References Cited

U.S. PATENT DOCUMENTS

| | | |
|---|---|---|
| 8,035,787 B2 | 10/2011 | Jung et al. |
| 8,111,341 B2 | 2/2012 | Jung et al. |
| 8,194,221 B2 | 6/2012 | Lu et al. |
| 8,203,687 B2 | 6/2012 | Choi et al. |
| 2003/0071952 A1* | 4/2003 | Yoshida ............ G02F 1/134363 349/141 |
| 2008/0036931 A1* | 2/2008 | Chan ................. G02F 1/133707 349/38 |
| 2009/0046233 A1* | 2/2009 | Cho .................. G02F 1/133707 349/141 |
| 2009/0213285 A1 | 8/2009 | Yun et al. |
| 2009/0244425 A1* | 10/2009 | Jung ................. G02F 1/133753 349/48 |
| 2009/0322659 A1* | 12/2009 | Chan ................. G02F 1/136213 345/87 |
| 2010/0157186 A1 | 6/2010 | Kim et al. |
| 2011/0199568 A1 | 8/2011 | Morishita et al. |
| 2012/0154723 A1 | 6/2012 | Chang et al. |
| 2013/0021570 A1 | 1/2013 | Zhang |
| 2013/0050625 A1 | 2/2013 | Jung et al. |
| 2013/0063686 A1 | 3/2013 | Tashiro et al. |

FOREIGN PATENT DOCUMENTS

| | | |
|---|---|---|
| KR | 10-2007-0049882 A | 5/2007 |
| KR | 10-2008-0051852 A | 6/2008 |

* cited by examiner

FIG. 24a
FIG. 24b
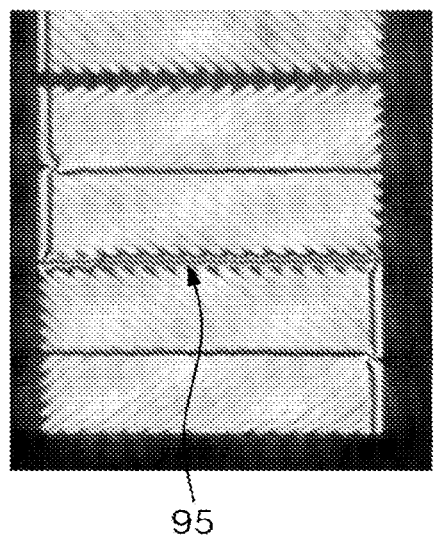
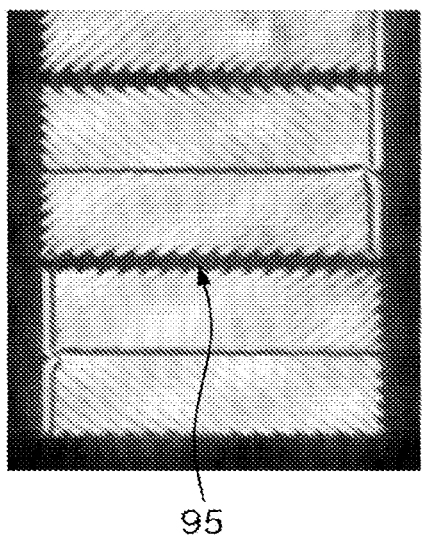

LIQUID CRYSTAL DISPLAY

CROSS-REFERENCE TO RELATED APPLICATION

This application is a continuation application of U.S. patent application Ser. No. 14/091,002 filed on Nov. 26, 2013, which claims priority to, and the benefit of, Korean Patent Application No. 10-2013-0078065 filed in the Korean Intellectual Property Office on Jul. 3, 2013, the entire contents of which are incorporated herein by reference.

BACKGROUND (a) Technical Field

Embodiments of the present invention relate generally to a liquid crystal display. More specifically, embodiments of the present invention relate to a liquid crystal display capable of producing images with reduced texture.

(b) Description of the Related Art

A liquid crystal display is one of the most common types of flat panel displays currently in use, and typically includes two sheets of panels with field generating electrodes such as a pixel electrode, a common electrode, and the like, with a liquid crystal layer interposed therebetween. The liquid crystal display generates an electric field in the liquid crystal layer by applying voltage to the field generating electrodes, and determines the direction of liquid crystal molecules of the liquid crystal layer by the generated electric field, thus controlling polarization of incident light so as to display images.

Among the various types of liquid crystal displays, a vertically aligned mode liquid crystal display, in which liquid crystal molecules are aligned so that long or major axes thereof are oriented vertical to upper and lower panels without applying the electric field, has been viewed favorably for its relatively large contrast ratio and relatively easily implemented wide reference viewing angle.

In order to implement a wide viewing angle in such a vertically aligned mode liquid crystal display, a plurality of domains having different alignment directions of the liquid crystal may be formed in one pixel.

One example of a means of forming the plurality of domains involves forming a pattern on the field generating electrode. According to this method, the plurality of domains may be formed by controlling the alignment direction of the liquid crystal by an edge of the pattern of the field generating electrode and a fringe field formed between the field generating electrodes.

The above information disclosed in this Background section is only for enhancement of understanding of the background of the invention and therefore it may contain information not in the prior art.

SUMMARY

The present invention has been made in an effort to provide a liquid crystal display having advantages of reducing a texture in images which may occur near a boundary of a domain, by increasing a liquid crystal control ability via a pattern in a field generating electrode of the liquid crystal display.

An exemplary embodiment of the present invention provides a liquid crystal display, including: a first electrode and a second electrode facing each other with a liquid crystal layer positioned therebetween, in which the first electrode includes a horizontal extension forming a boundary between adjacent portions of the first electrode, and a vertical extension connected to the horizontal extension. The horizontal stem includes a portion which has a largest width at a position proximate to the vertical extension, and which has a smaller width at a position farther from the vertical extension.

The vertical extension may include a portion which has a largest width at a position proximate to the horizontal extension, and which has a smaller width at a position farther from the horizontal extension.

A width of the horizontal extension or the vertical extension may be about 5 μm or more and about 8 μm or less.

The vertical extension may define at least a portion of an outer edge of the first electrode.

The first electrode may include an upper unit electrode and a lower unit electrode which are positioned adjacent to each other with a gap therebetween and which are electrically connected to each other, and the upper unit electrode and the lower unit electrode each may each have one or more of the horizontal extension and the vertical extension.

The liquid crystal display may further include a field shielding part overlapping the gap.

The first electrode may further include a plurality of branches extending from at least one of the vertical extension and the horizontal extension, and the field shielding part may include a connection part connecting ends of at least some of the branches of at least one of the upper unit electrode and the lower unit electrode.

The connection part may further include a first connection part connecting ends of branches of the upper unit electrode, and a second connection part connecting ends of branches of the lower unit electrode. The upper and lower unit electrodes may be positioned within a pixel area of the liquid crystal display, the pixel area having a leftmost portion and a rightmost portion; and the first connection part may be positioned within one of the leftmost portion and the rightmost portion, and the second connection part may be positioned within the other one of the leftmost portion and the rightmost portion.

The liquid crystal display may further include a storage electrode line configured to transfer a common voltage and overlapping at least one of the first electrode and an electrode connected to the first electrode, so as to form a storage capacitor, in which the field shielding part may include a horizontal portion connected to the storage electrode line.

The liquid crystal display may further include a data line configured to transfer a data voltage to the first electrode; and a shielding electrode substantially surrounding the first electrode and overlapping the data line, in which the field shielding part may include a horizontal portion connected to the shielding electrode.

The shielding electrode may be positioned in a same layer as that of the lower electrode.

Another exemplary embodiment of the present invention provides a liquid crystal display including: a first panel and a second panel facing each other with a liquid crystal layer positioned therebetween, in which the first panel includes a first electrode including a first subregion and a second subregion which are positioned adjacent to each other with a gap therebetween, the second panel includes a second electrode facing the first electrode, the first subregion is configured to facilitate orientation of liquid crystal molecules of the liquid crystal layer along a first direction, the second subregion is configured to facilitate orientation of the liquid crystal molecules along a second direction substantially opposite to the first direction, and the first panel further includes a field shielding part overlapping the gap.

The first subregion may include a plurality of branches of the first electrode, the second subregion may include a plurality of branches of the first electrode that extend in a substantially opposite direction to a direction in which the branches of the first subregion extend, and the field shielding part may include a connection part that connects ends of at least some of the branches of the first subregion to at least some of the branches of the second subregion.

The connection part may further include a first connection part connecting ends of branches of the first subregion, and a second connection part connecting ends of branches of the second subregion. The first and second subregions may be positioned within a pixel area of the liquid crystal display, the pixel area having a leftmost portion and a rightmost portion. The first connection part may be positioned within one of the leftmost portion and the rightmost portion, and the second connection part may be positioned within the other one of the leftmost portion and the rightmost portion.

The first panel may further include a storage electrode line configured to transfer a common voltage and which overlaps at least one of the lower electrode and an electrode connected to the first electrode, so as to form a storage capacitor, and the field shielding part may include a horizontal portion connected to the storage electrode line.

The first panel may further include a data line configured to transfer a data voltage to the first electrode, and a shielding electrode that substantially surrounds the first electrode and that overlaps the data line, wherein the field shielding part may include a horizontal portion connected to the shielding electrode.

The first electrode may include a unit electrode including the first subregion, the unit electrode may include a horizontal extension that forms a boundary between the first subregion and a third subregion adjacent to the first subregion, and a vertical extension connected to the horizontal extension. The horizontal extension may include a portion that has a largest width at a position proximate to the vertical extension, and which has a smaller width at a position farther from the vertical extension.

According to the exemplary embodiment of the present invention, it is possible to reduce a texture which may occur in images near a boundary of a domain by increasing a liquid crystal control ability, via a pattern which is included in a field generating electrode of a liquid crystal display.

BRIEF DESCRIPTION OF THE DRAWINGS

FIGS. 24a and 24b are photographs illustrating luminance displayed by a part of one pixel of a conventional liquid crystal display and one constructed according to an exemplary embodiment of the present invention, respectively.

DETAILED DESCRIPTION OF THE EMBODIMENTS

Figure 1:
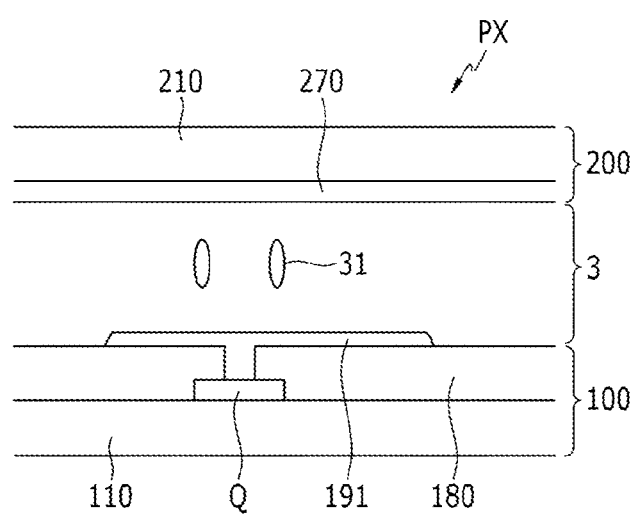
FIG. 1 is a cross-sectional view illustrating a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The various features of the described embodiments may be mixed and matched to form further embodiments as contemplated by the invention. All numerical values are approximate, and may vary.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a liquid crystal display according to an exemplary embodiment of the present invention will be described with reference to FIGS. 1 and 2.

FIG. 1 is a cross-sectional view illustrating a liquid crystal display according to an exemplary embodiment of the present invention, and FIGS. 2 to 5 are plan views of a lower electrode of the liquid crystal display according to the exemplary embodiment of the present invention.

Referring to FIG. 1, a liquid crystal display according to an exemplary embodiment of the present invention includes a plurality of pixels PX, and one pixel PX includes a lower panel 100 and an upper panel 200 facing each other, with a liquid crystal layer 3 interposed between the two panels 100 and 200.

First, in the upper panel 200, an upper electrode 270 is positioned on an insulation substrate 210. The upper electrode 270 may be made of a transparent conductive material such as ITO or IZO or a metal. The upper electrode 270 may receive a common voltage Vcom.

The upper electrodes 270 may be connected to each other to effectively form a single electrode extending throughout the upper panel 200, and may include one or more openings (not illustrated). In this case, the opening of the upper electrode may have a predetermined shape for each pixel.

The upper panel 200 may further include a color filter (not illustrated) positioned below the upper electrode 270, as well as a light blocking member (not illustrated). The light blocking member is called a black matrix and may prevent light leakage between the pixels. The color filter may display any color, such as one of the three primary colors of red, green and blue. In an alternate configuration, at least one of the color filter and the light blocking member may be positioned on the lower panel 100. When the upper panel 200 includes the color filter or the light blocking member, an overcoat (not illustrated) may be positioned between the color filter or the light blocking member and the upper electrode 270.

Next, in the lower panel 100, a plurality of signal lines (not illustrated) and switching elements Q connected thereto are positioned on the insulation substrate 110.

The plurality of signal lines may include a plurality of gate lines (not illustrated) and a plurality of data lines (not illustrated). Each gate line 121 transfers a gate signal and extends mainly in a horizontal direction. Each data line may cross the gate line yet remain insulated therefrom, and may transfer a data voltage.

The switching element Q may include at least one thin film transistor. The thin film transistor is a three-terminal element, and may include a gate electrode connected to the gate line, a source electrode connected to the data line, and a drain electrode facing the source electrode. The thin film transistor may further include a semiconductor (not illustrated) made of hydrogenated amorphous, polycrystalline silicon or an oxide semiconductor. The switching elements Q and their construction are known.

A passivation layer 180 including an organic insulator or an inorganic insulator is positioned on the switching element Q. The passivation layer 180 may include a contact hole exposing the drain electrode of the switching element Q.

A lower electrode 191 may be positioned on the passivation layer 180. The lower electrode 191 may be made of a transparent conductive material such as ITO or IZO, or a reflective metal such as aluminum, silver, chromium, or an alloy thereof. The lower electrode 191 is connected with the drain electrode of the switching element Q through the contact hole of the passivation layer 180, so as to receive a data voltage.

Figure 2:
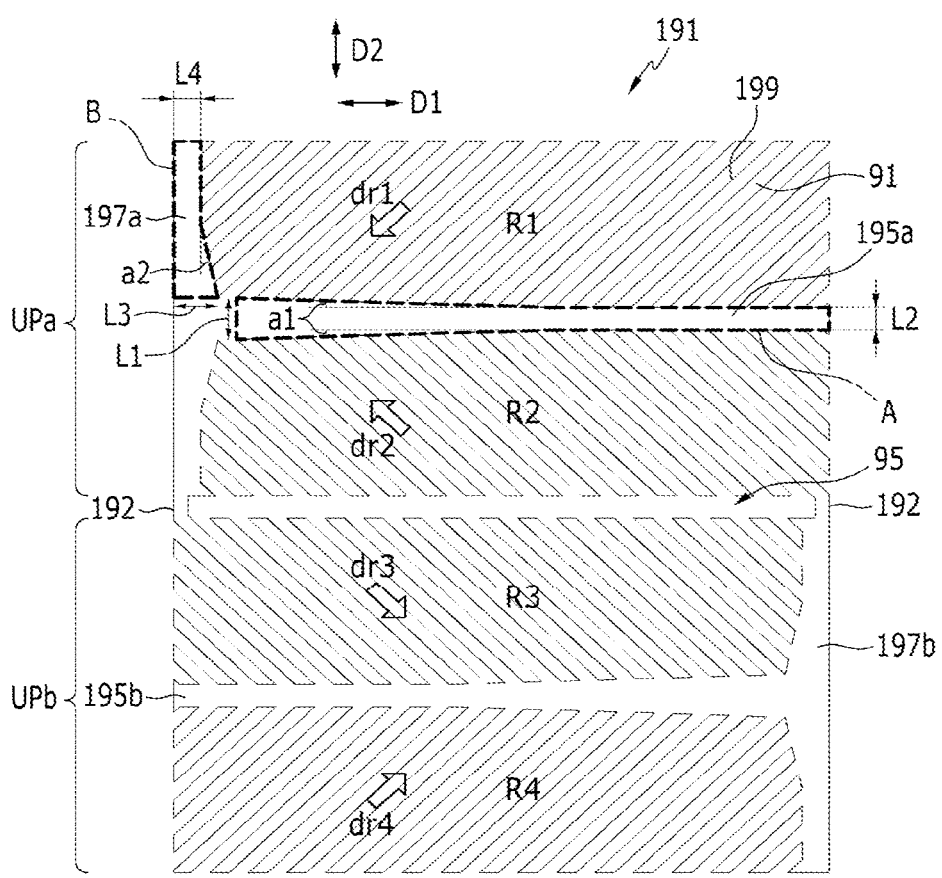
FIG. 2 is a plan view of a lower electrode of the liquid crystal display according to the exemplary embodiment of the present invention.

Referring to FIG. 2, an overall shape of the lower electrode 191 is that of a quadrangle, and includes an upper unit electrode UPa and a lower unit electrode UPb which are adjacent to each other with a gap 95 therebetween. The upper unit electrode UPa and the lower unit electrode UPb are electrically connected to each other through at least one connection part 192. The connection part 192 may be made of the same material, and be positioned on the same layer, as the lower electrode 191.

The upper unit electrode UPa includes at least one horizontal stem 195a, and at least one vertical stem 197a connected thereto. The vertical stem 197a mainly extends in a vertical direction D2, and defines one edge of the upper unit electrode UPa, for example, a left edge. The horizontal stem 195a may extend in a horizontal direction D1, which is a direction substantially perpendicular to the vertical stem 197a, from the center of the vertical stem 197a.

The lower unit electrode UPb has a mirror symmetric shape to a shape of the upper unit electrode UPa. In detail, the lower unit electrode UPb includes at least one horizontal stem 195b, and at least one vertical stem 197b connected thereto. The vertical stem 197b mainly extends in a vertical direction D2, and defines one edge of the lower unit electrode UPb, for example, a right edge. The horizontal stem 195b may extend in a horizontal direction D1, which is a direction substantially perpendicular to the vertical stem 197b, from the center of the vertical stem 197b.

Lengths of the horizontal stems 195a and 195b may be greater than lengths of the vertical stems 197a and 197b.

Each of the horizontal stems 195a and 195b includes a portion having a width that varies along its length, and the horizontal stems 195a and 195b have the largest widths at a position connected to the respective vertical stems 197a and 197b. The horizontal stems 195a and 195b taper, or become narrower, with distance from their respective vertical stems 197a and 197b.

In detail, at least one of an upper side and a lower side of the tapered portions of each of the horizontal stems 195a and 195b may form a first tilt angle a1 with the horizontal direction D1. The first tilt angle a1 may be larger than 0 degrees and may be approximately 1 degree or less. The largest width L1 of the portion having the changed width in each of the horizontal stems 195a and 195b may be maximally approximately 8 μm, and the smallest width L2 may be approximately 5 μm or more, but it is not limited thereto, and may be smaller than 5 μm according to variables such as process capacity or an exposure limit of an exposer.

According to an exemplary embodiment of the present invention, each of the horizontal stems 195a and 195b may further include a portion having a predetermined width. In this case, the portion having a predetermined width in each of the horizontal stems 195a and 195b may be positioned at a far side from the vertical stems 197a and 197b to which the corresponding horizontal stems 195a and 195b are connected. That is, the horizontal stems 195a and 195b may taper at near ends close to the vertical stems 197a, 197b to which they are connected, and may have predetermined or perhaps constant widths at far ends opposite to the near ends. Accordingly, each of the horizontal stems 195a and 195b may have a substantially funnel shape such as that shown by portion "A" illustrated in FIG. 2. The width of the portion having the predetermined width in each of the horizontal stems 195a and 195b may be the same as the smallest width L2 of the horizontal stems 195a and 195b. That is, portion "A" may continue to taper, or it may be of constant width.

Each of the vertical stems 197a and 197b includes a portion having a varying width, and the vertical stems 197a and 197b have the largest widths near their connection to the horizontal stems 195a and 195b. Each of the vertical stems 197a and 197b may taper, or become narrower with distance from their respective horizontal stems 195a and 195b.

In detail, edges of the tapered portions of the horizontal stems 195a and 195b may form a second tilt angle a2 with the vertical direction D2. The second tilt angle a2 may be larger than 0 degrees and may be approximately 2 degrees or less. Outer sides of the vertical stems 197a and 197b (i.e. the sides facing the exterior of lower electrode 191) may extend to be substantially parallel to the vertical direction D2, i.e. may be straight instead of tapered. The largest width L3 of the tapered portions of the vertical stems 197a and 197b may be maximally approximately 8 µm, and the smallest width L4 may be approximately 5 µm or more, but neither is limited thereto, for example width L4 may be smaller than 5 µm according to variables such as process capacity or an exposure limit of an exposer.

According to an exemplary embodiment of the present invention, each of the vertical stems 197a and 197b may further include a portion having a predetermined width. In this case, the respective ends farthest from their horizontal stems 195a and 195b may be of the predetermined width. Accordingly, each of the vertical stems 197a and 197b may have a substantially funnel shape like portion "B" illustrated in FIG. 2. The width of the portion having the predetermined width in each of the vertical stems 197a and 197b may be the same as the smallest width L4 of the vertical stems 197a and 197b. That is, portion "B" may continue to taper, or it may be of constant width.

According to an exemplary embodiment of the present invention, only one of the horizontal stems 195a and 195b and the vertical stems 197a and 197b may have a portion of varying width.

Referring to FIG. 2, the lower electrode 191 is divided into a plurality of subregions R1, R2, R3, and R4 by the horizontal stems 195a and 195b, the vertical stems 197a and 197b, and the gap 95. The horizontal stems 195a and 195b, the vertical stems 197a and 197b, and the gap 95 form a boundary between the adjacent subregions R1, R2, R3, and R4.

The lower electrode 191 may further include a plurality of minute branches 199 formed in each of the subregions R1, R2, R3, and R4. The minute branches 199 may extend obliquely outward from the horizontal stems 195a and 195b or the vertical stems 197a and 197b. The minute branches 199 in the different subregions R1, R2, R3, and R4 of one lower electrode 191 may extend in different directions. Particularly, the minute branches 199 in the adjacent subregions R1, R2, R3, and R4 may extend in two different directions which are perpendicular to each other. Within each subregion R1, R2, R3, or R4, the direction at which the minute branches 199 extend may be uniform.

In detail, the minute branches 199 of the upper subregion R1 may extend obliquely toward an upper right direction from the horizontal stem 195a or the vertical stem 197a, and the minute branches 199 of the lower subregion R2 may extend obliquely toward a lower right direction from the horizontal stem 195a or the vertical stem 197a. Further, the minute branches 199 of the upper subregion R3 may extend obliquely toward an upper left direction from the horizontal stem 195b or the vertical stem 197b, and the minute branch 199 of the lower subregion R4 may extend obliquely toward a lower left direction from the horizontal stem 195b or the vertical stem 197b.

A minute slit 91 in which an electrode is removed is positioned between the adjacent minute branches 199.

Widths of the minute branches 199 and the minute slits 91 may be about 5 µm to about 8 µm, but are not limited thereto. Further, a ratio of the widths of the minute branch 199 to the minute slit 91 may be about 1.5:1 to about 1:1.5, but is not limited thereto and may be appropriately controlled by considering different factors such as display characteristics.

An acute angle between the minute branches 199 and the horizontal stems 195a and 195b may be about 40 degrees to 45 degrees, but is not limited thereto and may vary, taking into account variables such as display characteristics such as visibility of the liquid crystal display.

Alignment layers (not illustrated) may be positioned on inner sides of the two panels 100 and 200, and may be vertical alignment layers. Further, polarizers (not illustrated) are provided on an outer side of at least one of the two panels 100 and 200, where transmissive axes of two polarizers are perpendicular to each other, and a transmissive axis of one polarizer may be parallel to the horizontal direction D1.

The liquid crystal layer 3 interposed between the two panels 100 and 200 includes liquid crystal molecules 31 having dielectric anisotropy. The liquid crystal molecules 31 may have, in particular, negative dielectric anisotropy. The liquid crystal molecules 31 may be aligned so that long axes thereof are substantially vertical to surfaces of the two panels 100 and 200 (i.e. substantially perpendicular to the two panels 100, 200) while the electric field is not applied to the liquid crystal layer 3.

The liquid crystal layer 3 positioned in one pixel PX includes a plurality of domains (not illustrated) having different tilt directions of the liquid crystal molecules 31 when the electric field is generated in the liquid crystal layer 3, thereby implementing a wide viewing angle. Within each domain, the tilt directions of the liquid crystal molecules 31 may be substantially uniform, and the predetermined direction is referred to a behavior direction of the liquid crystal molecules 31. In one pixel PX, the domains of the liquid crystal layer 3 may correspond to the plurality of subregions R1 to R4 of the lower electrode 191, respectively. For example, when the four subregions R1 to R4 of the lower electrode 191 are included, the liquid crystal layer 3 corresponding thereto may have four domains in each pixel PX.

For more rapid response speed, the liquid crystal molecules 31 of each domain form pretilts in respective behavior directions when the electric field is not applied to the liquid crystal layer 3, so as to be initially aligned. As such, alignment layers having various alignment directions may be used so that the liquid crystal molecules 31 have pretilts in the initial stages (prior to application of an electric field), and the liquid crystal layer 3 or the alignment layer may include a cured alignment aiding agent for the pretilts of the liquid crystal molecules 31. In the case where the alignment layer forms the pretilts of the liquid crystal molecules 31, light such as ultraviolet light is obliquely irradiated to the alignment layer to control initial alignment directions and alignment angles of the liquid crystal molecules 31.

Next, an operation of the liquid crystal display according to the exemplary embodiment of the present invention will be described with reference to FIGS. 3a and 3b in addition to FIGS. 1 and 2 described above.

Figure 3A:
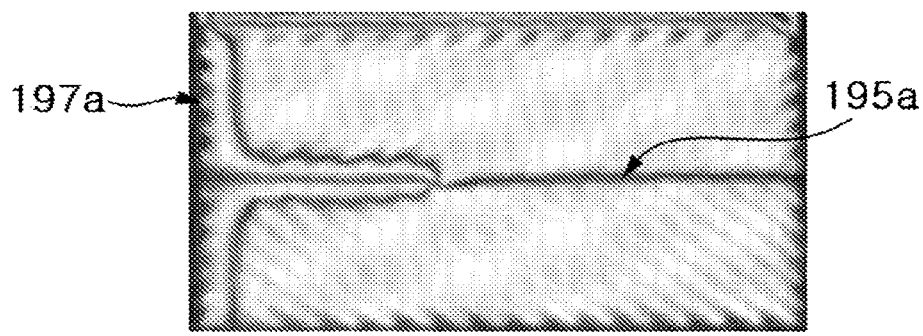
FIGS. 3a and 3b are photographs illustrating luminance displayed by a part of one pixel of a conventional liquid crystal display and one constructed according to an exemplary embodiment of the present invention, respectively.
Figure 3B:
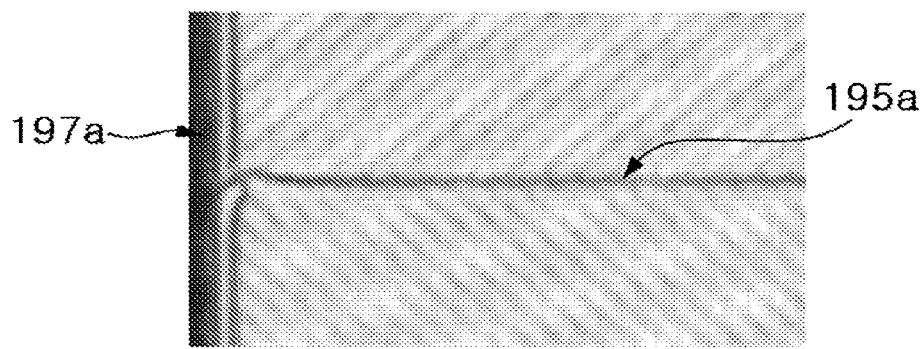

FIGS. 3a and 3b are photographs illustrating luminance displayed by a part of one pixel of a conventional liquid crystal display and one constructed according to an exemplary embodiment of the present invention, respectively.

When the switching element Q is turned on by applying a gate-on voltage Von to the gate electrode of the switching element Q, a data voltage is applied to the lower electrode 191. The lower electrode 191 to which the data voltage is applied, together with the upper electrode 270 to which a common voltage Vcom is applied, generate an electric field in the liquid crystal layer 3.

The electric field includes vertical components of directions substantially perpendicular to the surfaces of the panels 100 and 200, and the liquid crystal molecules 31 are tilted in a substantially parallel direction to the surfaces of the panels 100 and 200 by the vertical components of the electric field. Meanwhile, a fringe field is formed between the edges of the horizontal stems 195a and 195b, the vertical stems 197a and 197b, and the minute branches 199 of the lower electrode 191 and the upper electrode 270, and thus the liquid crystal molecules 31 are mostly tilted toward a connection portion of the horizontal stems 195a and 195b and the vertical stems 197a and 197b (i.e. oriented toward the connection between horizontal stems 195a, 195b, and vertical stems 197a, 197b), and in a direction substantially parallel to the minute branches 199. Accordingly, a plurality of domains having different tilt directions of the liquid crystal molecules 31 is formed in the liquid crystal layer 3 of one pixel PX. The liquid crystal molecules 31 corresponding to the subregion R1 are mostly tilted in a first direction dr1, the liquid crystal molecules 31 corresponding to the subregion R2 are mostly tilted in a second direction dr2, the liquid crystal molecules 31 corresponding to the subregion R3 are mostly tilted in a third direction dr3, and the liquid crystal molecules 31 corresponding to the subregion R4 are mostly tilted in a fourth direction dr4. The first to fourth directions dr1, dr2, dr3, and dr4 become behavior directions of the respective liquid crystal molecules 31.

Particularly, according to an exemplary embodiment of the present invention, at the connection portion between the horizontal stems 195a and 195b and the vertical stems 197a and 197b, since edges of the horizontal stems 195a and 195b or the vertical stems 197a and 197b are tilted at the first tilt angle a1 or the second tilt angle a2, a control ability (referred to as a liquid crystal control ability) for the behavior directions of the liquid crystal molecules 31 may be increased around the horizontal stems 195a and 195b and the vertical stems 197a and 197b. Particularly, directivity of the liquid crystal molecules 31 may be better controlled near the connection portion of the horizontal stems 195a and 195b and the vertical stems 197a and 197b, and as a result, a texture of the resulting image in that area may be reduced.

Furthermore, the control ability for the liquid crystal molecules 31 near the connection portion between the horizontal stems 195a and 195b and the vertical stems 197a and 197b further reinforces the control ability of the behavior directions of the liquid crystal molecules 31 near portions of the horizontal stems 195a and 195b that are far from the connection with vertical stems 197a and 197b, thereby further reducing a texture around the horizontal stems 195a and 195b and further increasing transmittance of the liquid crystal layer.

Referring to FIGS. 3a and 3b, when the widths of the horizontal stem 195a and the vertical stem 197a are uniform, as in FIG. 3a, the directions of the liquid crystal molecules 31 are not well controlled near the horizontal stem 195a and the vertical stem 197a, so that a disorderly texture region appears, as can be seen in FIG. 3a. Further, according to an exemplary embodiment of the present invention, as can be seen in FIG. 3b, it may be verified that the texture region disappears near the horizontal stem 195a and the vertical stem 197a.

Meanwhile, maximum widths of the horizontal stems 195a and 195b or the vertical stems 197a and 197b may be larger than about 8 μm, but even in this case, the liquid crystal control ability around the horizontal stems 195a and 195b or the vertical stems 197a and 197b is not significantly increased, rather regions where the behavior directions of the liquid crystal molecules 31 are not controlled may be increased near the position where the horizontal stems 195a and 195b and the vertical stems 197a and 197b of the lower electrode 191 are connected to each other. Accordingly, the widths of the horizontal stems 195a and 195b or the vertical stems 197a and 197b of the lower electrode 191 may be kept at about 8 μm or less.

Next, a liquid crystal display according to an exemplary embodiment of the present invention will be described with reference to FIGS. 4 to 6. The same constituent elements as the exemplary embodiment described above designate the same reference numerals, and any duplicated description is thus omitted.

Figure 4:
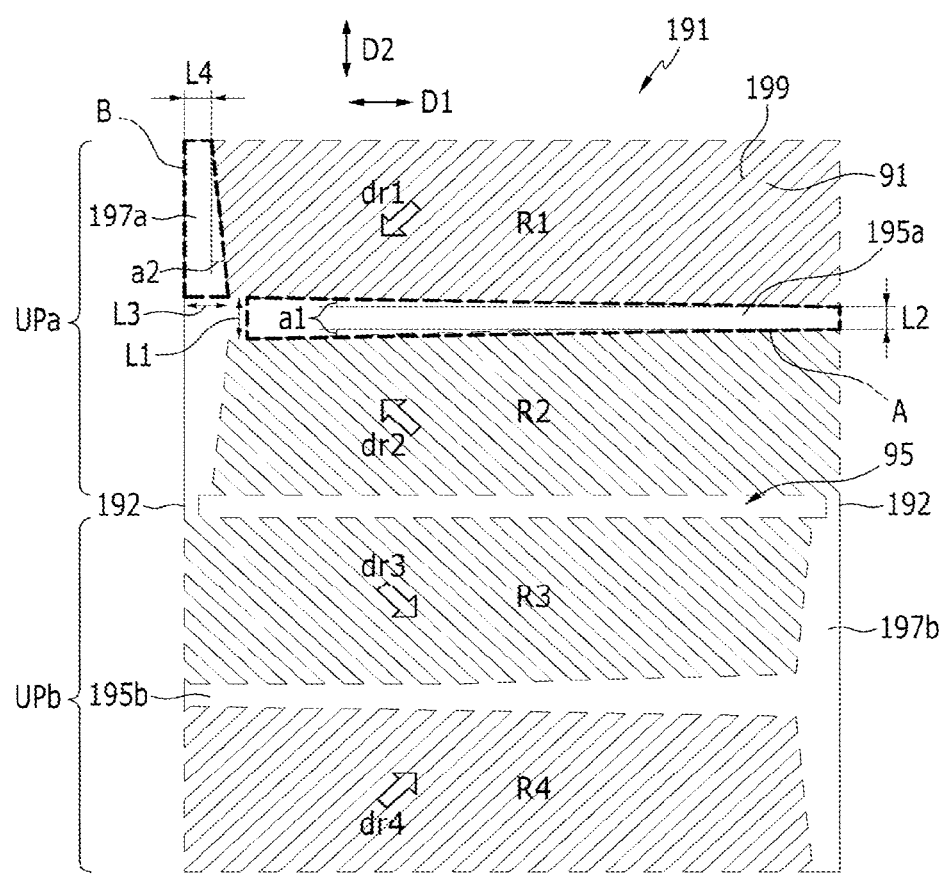
FIGS. 4 to 6 are plan views of a lower electrode of a liquid crystal display according to an exemplary embodiment of the present invention.
Figure 5:
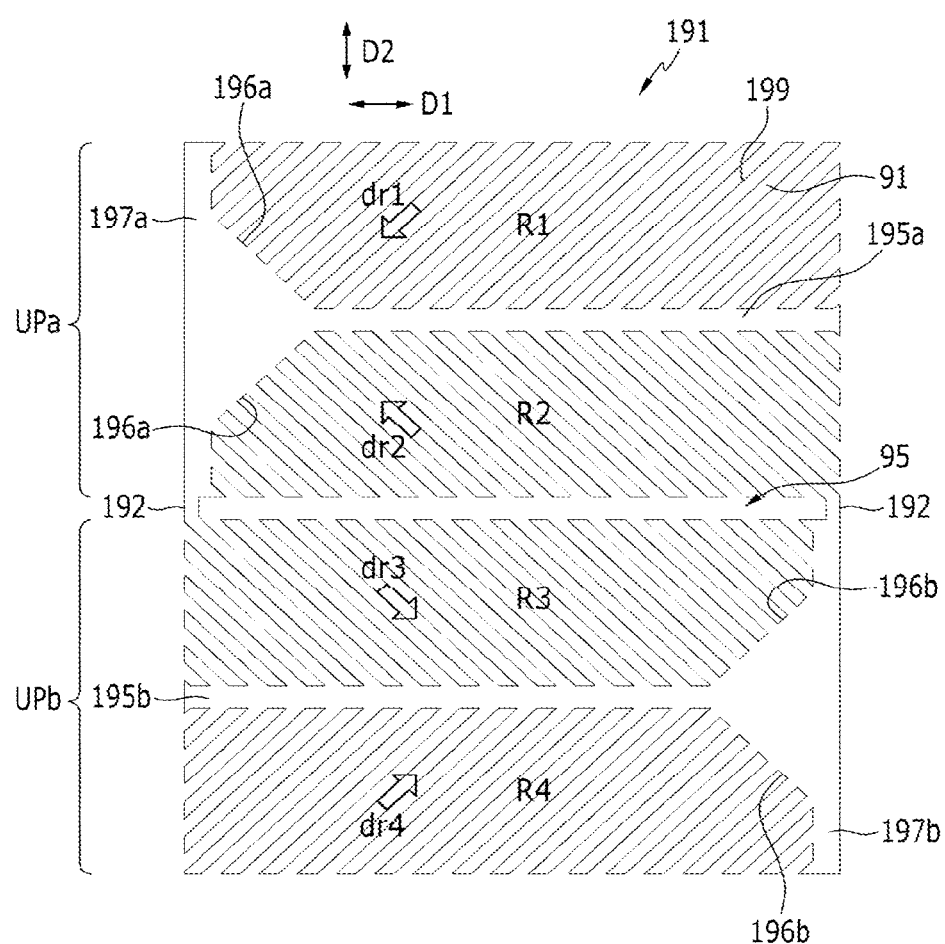
Figure 6:
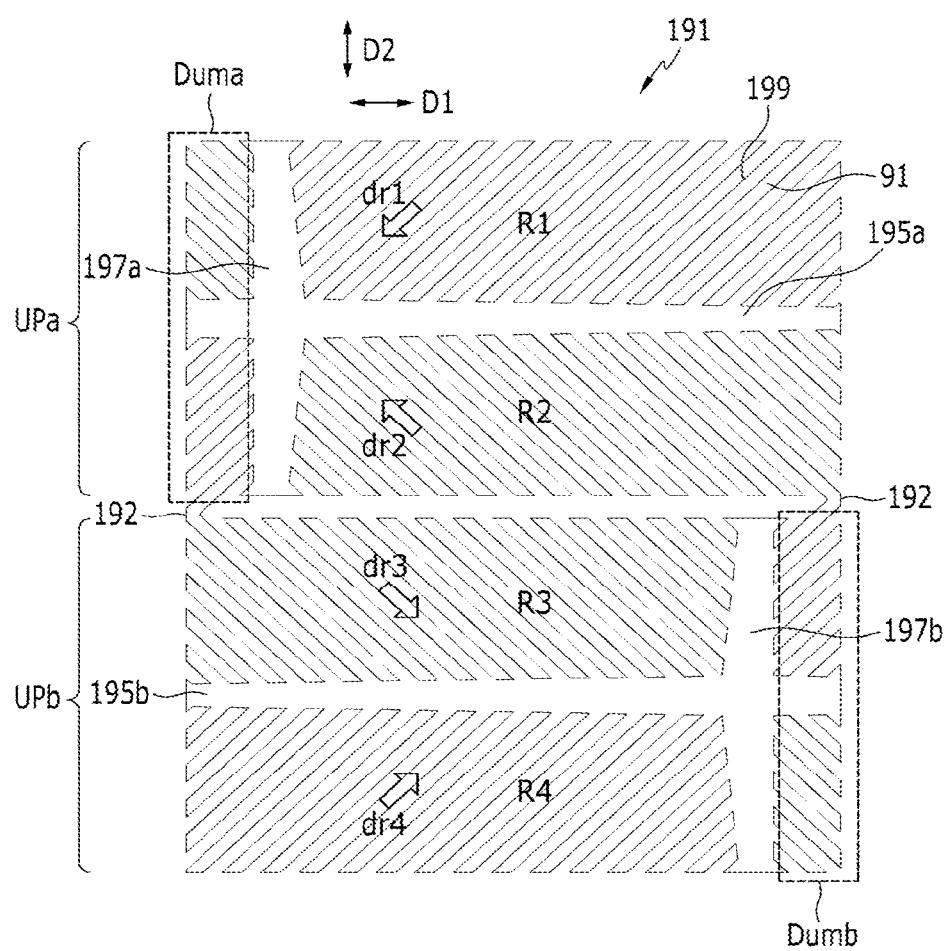

FIGS. 4 to 6 are plan views of a lower electrode of a liquid crystal display according to an exemplary embodiment of the present invention.

First, referring to FIG. 4, the liquid crystal display according to this exemplary embodiment is almost the same as that of the exemplary embodiment described above, except for differing shapes of the horizontal stems 195a and 195b and the vertical stems 197a and 197b of the lower electrode 191.

According to an exemplary embodiment of the present invention, each of the horizontal stems 195a and 195b does not include a portion having a predetermined or constant width, but rather the width continues to taper down. That is, the widths of the horizontal stems 195a and 195b may be gradually decreased even away from the connections to the vertical stems 197a and 197b, unlike portion "A" illustrated in FIG. 4.

Even in the exemplary embodiment, at least one of an upper side and a lower side of each of the horizontal stems 195a and 195b may form a first tilt angle a1 with the horizontal direction D1. The first tilt angle a1 may be larger than 0 degrees and may be approximately 1 degree or less. The largest width L1 of each of the horizontal stems 195a and 195b may be at most approximately 8 μm, and the smallest width L2 may be approximately 5 μm or more, but is not limited thereto, and may be smaller than 5 μm according to variables such as process capacity or an exposure limit of an exposer.

Similarly, each of the vertical stems 197a and 197b may not include a portion having constant width. The width of each of the vertical stems 197a and 197b may be changed at a predetermined ratio in one direction from the connection part with the horizontal stems 195a and 195b. That is, the widths of the entire vertical stems 197a and 197b may have the same degree of taper along their entire lengths, even far away from the horizontal stems 195a and 195b, unlike part "B" illustrated in FIG. 4.

Even in this exemplary embodiment, the sides of each of the vertical stems 197a and 197b that face their branches 199 may form a second tilt angle a2 with the vertical direction D2. The second tilt angle a2 may be larger than 0 degrees and may be approximately 2 degrees or less. Outer sides of the vertical stems 197a and 197b may still be substantially parallel to the vertical direction D2. The largest width L3 of each of the vertical stems 197a and 197b may be maximally approximately 8 μm, and the smallest width L4 may be approximately 5 μm or more, but is not limited thereto, and may be smaller than 5 μm according to factors such as process capacity or an exposure limit of an exposer.

Next, referring to FIG. 5, the liquid crystal display according to this exemplary embodiment is almost the same as that of the exemplary embodiment described above, but shapes of the horizontal stems 195a and 195b and the vertical stems 197a and 197b of the lower electrode 191 may be different from each other.

According to an exemplary embodiment of the present invention, widths of most of the horizontal stems 195a and 195b and widths of most of the vertical stems 197a and 197b may each be substantially uniform. Further, the lower electrode 191 may further include central patterns 196a and 196b positioned at the connection portion between the horizontal stems 195a and 195b and the vertical stems 197a and 197b. Each of the central patterns 196a and 196b may be a polygon including respective sides positioned in the adjacent subregions R1 to R4, for example, a triangle. Apexes of the central patterns 196a and 196b may be positioned on the horizontal stems 195a and 195b or the vertical stems 197a and 197b. A length of one side of the central patterns 196a and 196b may be about 10 μm to about 40 μm, but is not limited thereto.

Next, referring to FIG. 6, the liquid crystal display according to this exemplary embodiment is almost the same as those of the exemplary embodiments described above, but the upper unit electrode UPa and/or the lower unit electrode UPb may further include dummy patterns Duma and Dumb positioned at a left side or a right side of the vertical stems 197a and 197b.

In detail, the upper unit electrode UPa may further include a dummy pattern Duma positioned at an opposite side of the vertical stem 197a as that of the two subregions R1 and R2, and the dummy pattern Duma may further include an extension of the horizontal stem 195a and a plurality of minute branches 199. The lower unit electrode UPb may further include a dummy pattern Dumb positioned at an opposite side of the vertical stem 197b as that of the two subregions R3 and R4, and the dummy pattern Dumb may further include an extension of the horizontal stem 195b and a plurality of minute branches 199.

Lengths of the extensions of the horizontal stems 195a and 195b may be less than ½ of those of the vertical stems 197a and 197b in each of the dummy patterns Duma and Dumb. The sides of the vertical stems 197a and 197b that are adjacent to the dummy patterns Duma and Dumb may extend to be substantially parallel to the vertical direction D2 as illustrated in FIG. 6. Alternatively, these sides may instead be oriented at the second tilt angle a2 with the vertical direction D2, like the sides of the vertical stems 197a and 197b that are adjacent to the subregions R1 to R4.

Next, a liquid crystal display according to an exemplary embodiment of the present invention will be described with reference to FIGS. 7 and 8.

Figure 7:
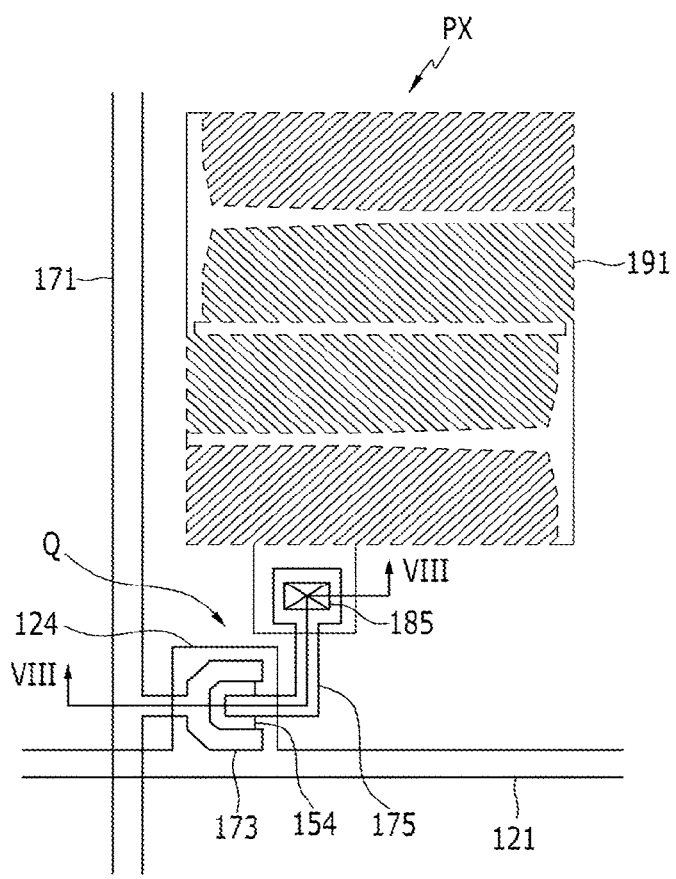
FIG. 7 is a layout view of one pixel of a liquid crystal display according to an exemplary embodiment of the present invention.
Figure 8:
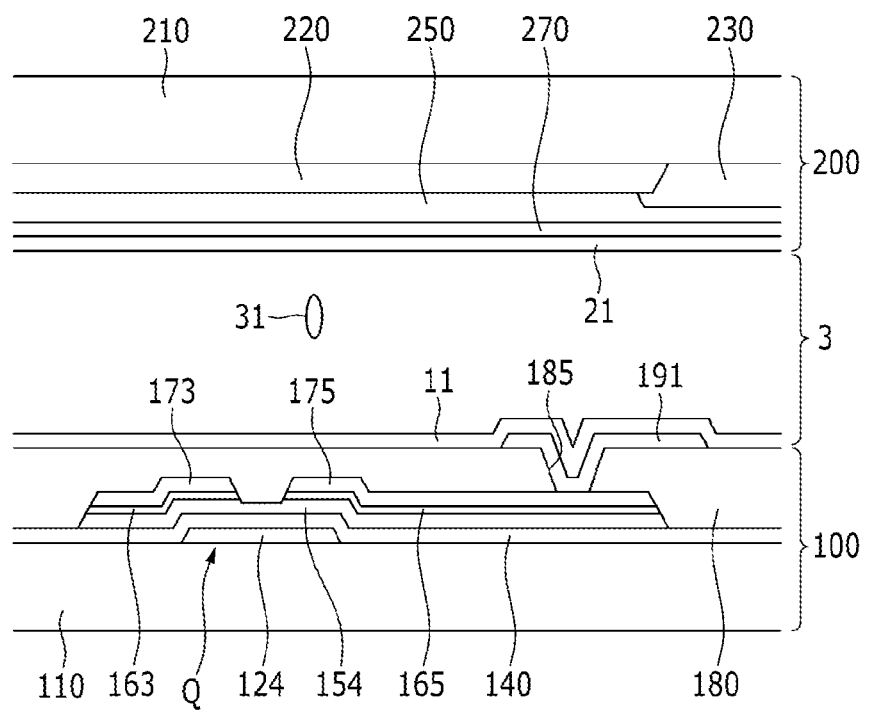
FIG. 8 is a cross-sectional view of the liquid crystal display of FIG. 7 taken along line VIII-VIII.

FIG. 7 is a layout view illustrating one pixel of a liquid crystal display according to an exemplary embodiment of the present invention, and FIG. 8 is a cross-sectional view of the liquid crystal display of FIG. 7 taken along line VIII-VIII.

Referring to FIGS. 7 and 8, a liquid crystal display according to this exemplary embodiment includes a lower panel 100 and an upper panel 200 facing each other, with a liquid crystal layer 3 interposed between the two panels 100 and 200.

First, in the lower panel 100, a gate line 121 including a gate electrode 124 is formed on an insulation substrate 110. The gate line 121 transfers a gate signal and extends mainly in a horizontal direction, in the view of FIG. 7.

A gate insulating layer 140 is formed on the gate line 121, and a semiconductor 154 made of, for example, hydrogenated amorphous or polycrystalline silicon, or an oxide semiconductor, is positioned on the gate insulating layer 140.

A data line 171 and a drain electrode 175 are formed on the semiconductor 154 and the gate insulating layer 140.

The data line 171 transfers a data voltage and mainly extends in a vertical direction to cross the gate line 121. The data line 171 includes a source electrode 173 which extends toward (and in this case, over) the gate electrode 124.

The drain electrode 175 is separated from the data line 171 and includes a portion which faces the source electrode 173.

The gate electrode 124, the source electrode 173, and the drain electrode 175 collectively form a thin film transistor (TFT) Q together with the semiconductor 154.

A passivation layer 180 made of an insulator is positioned on the thin film transistor Q. A contact hole 185 exposing the drain electrode 175 is formed in the passivation layer 180.

A lower electrode 191 is formed on the passivation layer 180. The lower electrode 191 may be the same as the lower electrode 191 described above according to the exemplary embodiments illustrated in FIGS. 1 to 6, and duplicate description thereof is omitted.

An alignment layer 11 may be positioned on the lower electrode 191.

In the upper panel 200, a color filter 230 and a light blocking member 220 may be positioned on an insulation substrate 210 in the upper panel 200. At least one of the light blocking member 220 and the color filter 230 may be positioned on the lower panel 100 instead.

An overcoat 250 is formed on the color filter 230 and the light blocking member 220, and an upper electrode 270 is positioned on the overcoat 250.

An alignment layer 21 may be positioned on the overcoat 250.

Since the liquid crystal layer 3 is the same as that of the exemplary embodiment described above, detailed description thereof is omitted.

When a data voltage is applied to the lower electrode 191 through the turned-on thin film transistor Q, and a common voltage is applied to the upper electrode 270, an electric field is generated in the liquid crystal layer 3. In this case, as described above, according to a structure of the lower electrode 191 according to an exemplary embodiment of the present invention, the liquid crystal control ability is increased around the horizontal stems and the vertical stems, thereby reducing a texture in the image, and increasing transmittance.

Next, a liquid crystal display according to another exemplary embodiment of the present invention will be described with reference to FIGS. 9 to 12.

Figure 9:
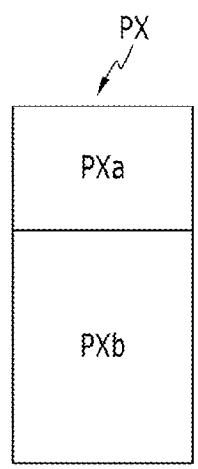
FIG. 9 is a diagram illustrating two subpixels included in one pixel of a liquid crystal display according to an exemplary embodiment of the present invention.
Figure 10:
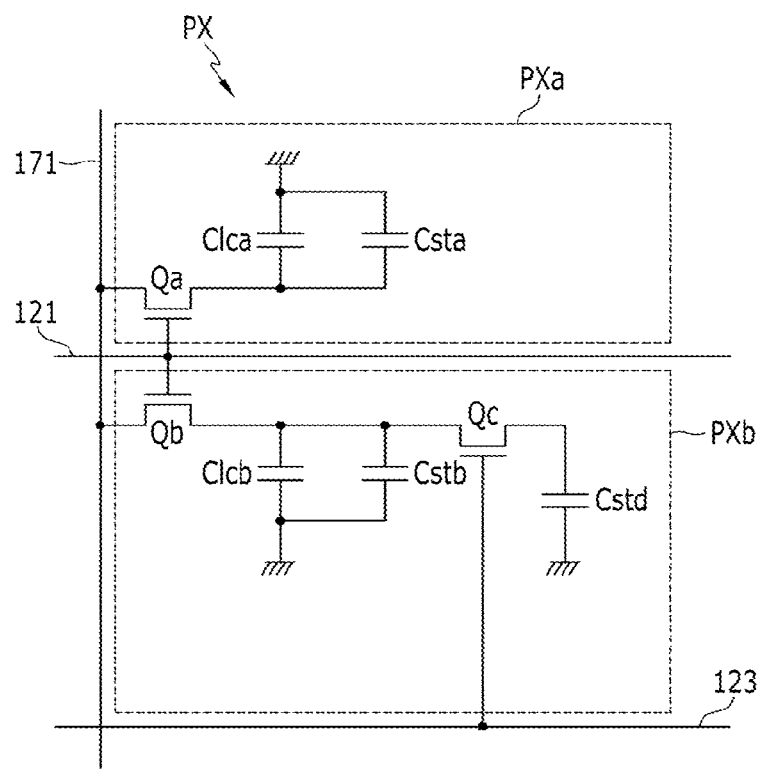
FIG. 10 is an equivalent circuit diagram of one pixel of the liquid crystal display according to the exemplary embodiment of the present invention.
Figure 11:
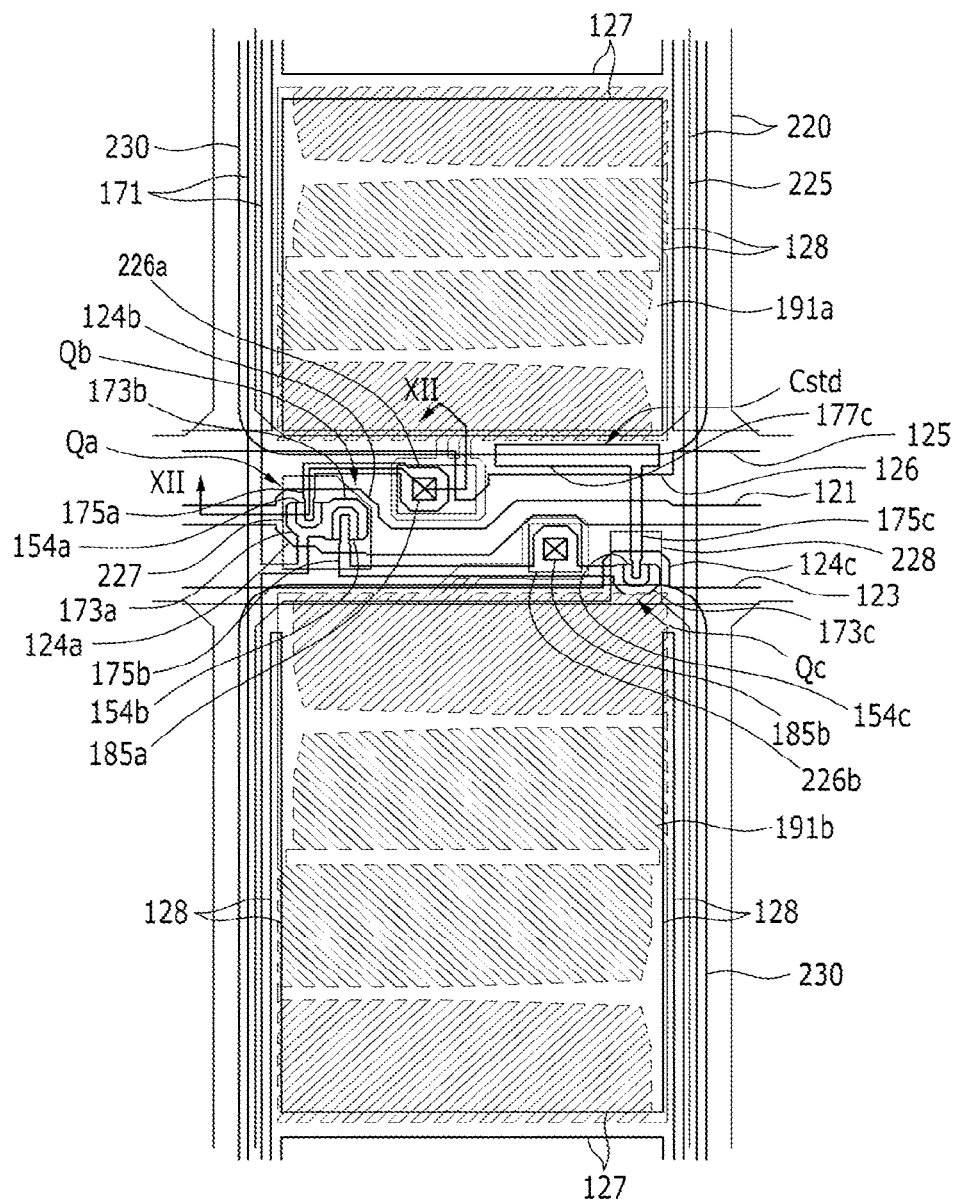
FIG. 11 is a layout view of one pixel of the liquid crystal display according to the exemplary embodiment of the present invention.
Figure 12:
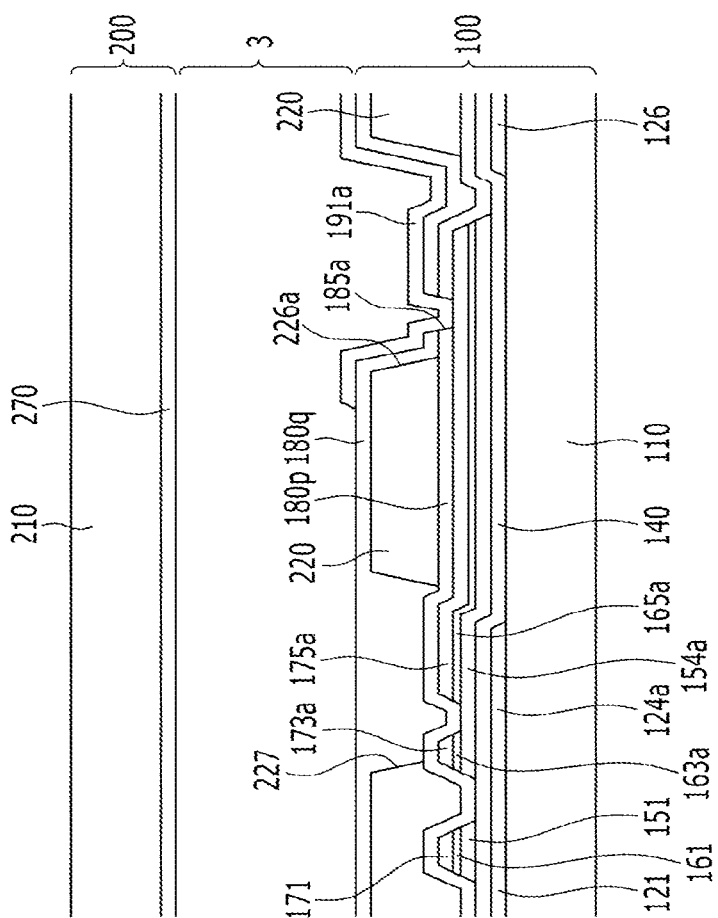
FIG. 12 is a cross-sectional view of the liquid crystal display of FIG. 11 taken along line XII-XII.

FIG. 9 is a diagram illustrating two subpixels included in one pixel of a liquid crystal display according to an exemplary embodiment of the present invention, FIG. 10 is an equivalent circuit diagram of one pixel of the liquid crystal display according to the exemplary embodiment of the present invention, FIG. 11 is a layout view of one pixel of the liquid crystal display according to the exemplary embodiment of the present invention, and FIG. 12 is a cross-sectional view of the liquid crystal display of FIG. 11 taken along line XII-XII.

Referring to FIG. 9, one pixel PX of the liquid crystal display according to the exemplary embodiment of the present invention may include a first subpixel PXa and a second subpixel PXb. The first subpixel PXa and the second subpixel PXb may display images according to different gamma curves with respect to one (i.e., the same) input image signal, but may also display images according to the same gamma curve. That is, the first subpixel PXa and the second subpixel PXb of one pixel PX may display images having different luminances for the same input image signal, in order to improve side visibility. Areas of the first subpixel PXa and the second subpixel PXb may be the same as each other, or different from each other. In FIG. 9, the area of subpixel PXa is less than the area of subpixel PXb.

As such, the pixel PX including the first subpixel PXa and the second subpixel PXb may have various circuit structures and layouts in order to display images at different luminances.

Referring to FIG. 10, the liquid crystal display according to the exemplary embodiment of the present invention may include signal lines including a gate line 121, a step-down gate line 123, and a data line 171, with a pixel PX connected thereto.

The first subpixel PXa of each pixel PX includes a first switching element Qa, a first liquid crystal capacitor Clca, and a first storage capacitor Csta. The second subpixel PXb includes second and third switching elements Qb and Qc, a second liquid crystal capacitor Clcb, a second storage capacitor Cstb, and a step-down capacitor Cstd. The first and second switching elements Qa and Qb are connected to the gate line 121 and the data line 171, and the third switching element Qc is connected to the step-down gate line 123. The first and second switching elements Qa and Qb are three-terminal elements such as a thin film transistor, with control terminals thereof connected to the gate line 121, input terminals connected to the data line 171, and output terminals connected to the first and second liquid crystal capacitors Clca and Clcb respectively, as well as the first and second storage capacitors Csta and Cstb respectively. The third switching element Qc is also a three-terminal element such as a thin film transistor, with a control terminal thereof connected to the step-down gate line 123, an input terminal connected to the second liquid crystal capacitor Clcb, and an output terminal connected to the step-down capacitor Cstd. The step-down capacitor Cstd is connected to the output terminal of the third switching element Qc and the common voltage.

In an operation of the pixel PX, first, when a gate-on voltage Von is applied to the gate line 121, the first and second thin film transistors Qa and Qb connected to the gate line 121 are turned on. Accordingly, the data voltage of the data line 171 is applied to the first and second liquid crystal capacitors Clca and Clcb through the turned-on first and second switching elements Qa and Qb, and as a result, the first and second liquid crystal capacitors Clca and Clcb are charged by a difference between the data voltage and the common voltage Vcom. In this case, a gate-off voltage Voff is applied to the step-down gate line 123. Next, when the gate-off voltage Voff is applied to the gate line 121 and the gate-on voltage Von is applied to the step-down gate line 123 at the same time, the first and second switching elements Qa and Qb are turned off, and the third switching element Qc is turned on. As a result, the charging voltage of the second liquid crystal capacitor Clcb connected to the output terminal of the second switching element Qb drops. Accordingly, in a liquid crystal display driven by frame inversion, the charging voltage of the second liquid crystal capacitor Clcb may always be lower than the charging voltage of the first liquid crystal capacitor Clca. Therefore, the charging voltages of the first and second liquid crystal capacitors Clca and Clcb are different from each other, thereby improving side visibility of the liquid crystal display.

FIGS. 11 and 12 illustrate an example of the liquid crystal display according to the exemplary embodiment of the present invention having the circuit structure illustrated in FIG. 10.

The liquid crystal display according to this exemplary embodiment includes a lower panel 100 and an upper panel 200 facing each other, with a liquid crystal layer 3 interposed between the two panels 100 and 200.

A plurality of gate conductors, including gate lines 121, step-down gate lines 123, and storage electrode lines 125, is formed on an insulation substrate 110 of the lower panel 100. The gate line 121 and the step-down gate line 123 mainly extend in a horizontal direction to transfer gate signals. The gate line 121 may include a first gate electrode 124a and a second gate electrode 124b, and the step-down gate line 123 may include a third gate electrode 124c. The first gate electrode 124a and the second gate electrode 124b are connected to each other. The storage electrode line 125 may mainly extend in a horizontal direction to transfer a predetermined voltage such as a common voltage Vcom. The storage electrode line 125 may include a storage extension 126, a pair of vertical portions 128 extending upward to be substantially perpendicular to the gate line 121, and a horizontal portion 127 connecting the pair of vertical portions 128. However, the structure of the storage electrode line 125 is not limited thereto, and any suitable structure is contemplated.

A gate insulating layer 140 is positioned on the gate conductor, and a semiconductor stripe 151 is positioned thereon. The semiconductor stripe 151 may mainly extend in a vertical direction, and include first and second semiconductors 154a and 154b which extend toward the first and second gate electrodes 124a and 124b and are connected with each other, as well as a third semiconductor 154c connected to the second semiconductor 154b.

An ohmic contact stripe 161 is formed on the semiconductor stripe 151. Also, ohmic contacts 163a and 165a are formed on the first semiconductor 154a, and respective ohmic contacts may be formed on the second semiconductor 154b and the third semiconductor 154c. However, the ohmic contacts 161 and 165a may also be omitted.

A data conductor including a data line 171, a first drain electrode 175a, a second drain electrode 175b, and a third drain electrode 175c is formed on the ohmic contacts 161 and 165a. The data line 171 may include a first source electrode 173a and a second source electrode 173b which extend toward and over the first gate electrode 124a and the second gate electrode 124b, respectively. Rod-shaped end portions of the first drain electrode 175a and the second drain electrode 175b are partially surrounded by the first source electrode 173a and the second source electrode 173b. One wide end portion of the second drain electrode 175b is again extended to form a third source electrode 173c which is bent in a generally 'U'-lettered shape. A wide end portion 177c of the third drain electrode 175c overlaps the storage extension 126 to form the step-down capacitor Cstd, and a rod-shaped end portion of the third drain electrode 175c is partially surrounded by the third source electrode 173c.

The first/second/third gate electrodes 124a/124b/124c, the first/second/third source electrodes 173a/173b/173c, and the first/second/third drain electrodes 175a/175b/175c form first/second/third thin film transistors Qa/Qb/Qc together with the first/second/third semiconductors 154a/154b/154c, respectively.

A lower passivation layer 180p is positioned on the data conductors 171, 175a, 175b, and 175c and exposed portions of the semiconductors 154a, 154b, and 154c, and a color filter 230 as well as a light blocking member 220 may be positioned thereon. The light blocking member 220 may include an opening 227 positioned on the first thin film transistor Qa and the second thin film transistor Qb, an opening 226a positioned on the wide end portion of the first drain electrode 175a, an opening 226b positioned on the wide end portion of the second drain electrode 175b, and an opening 228 positioned on the third thin film transistor Qc. In the alternative, at least one of the color filter 230 and the light blocking member 220 may be positioned on the upper panel 200.

An upper passivation layer 180q is formed on the color filter 230 and the light blocking member 220. A plurality of contact holes 185a and 185b exposing the first drain electrode 175a and the second drain electrode 175b, respectively, is formed in the lower passivation layer 180p and the upper passivation layer 180q.

A first subpixel electrode 191a and a second subpixel electrode 191b of one pixel PX are formed on the upper passivation layer 180q. Each of the first subpixel electrode 191a and the second subpixel electrode 191b may have the same structure as any one of the lower electrodes 191 according to the exemplary embodiments described above. FIG. 11 illustrates an example in which each of the first subpixel electrode 191a and the second subpixel electrode 191b has the same structure as the lower electrode 191 according to the exemplary embodiment illustrated in FIGS. 1 and 2 described above.

The first subpixel electrode 191a may receive a data voltage from the first drain electrode 175a through the contact hole 185a, and the second subpixel electrode 191b may receive a data voltage from the second drain electrode 175b through the contact hole 185b.

Since the upper panel 200 and the liquid crystal layer 3 are the same as those of the exemplary embodiments described above, detailed description thereof is omitted.

The first subpixel electrode 191a and the upper electrode 270 form a first liquid crystal capacitor Clca together with the liquid crystal layer 3 therebetween, and the second subpixel electrode 191b and the upper electrode 270 form a second liquid crystal capacitor Clcb together with the liquid crystal layer 3 therebetween. As a result, even after the first and second thin film transistors Qa and Qb are turned off, the applied voltage is maintained for some time. Further, the first and second subpixel electrodes 191a and 191b may overlap the storage electrode lines 125 to form the first and second storage capacitors Csta and Cstb.

Next, a liquid crystal display according to an exemplary embodiment of the present invention will be described with reference to FIGS. 13 to 16. The same constituent elements as the exemplary embodiments described above designate the same reference numerals, and thus any duplicate description is omitted.

Figure 13:
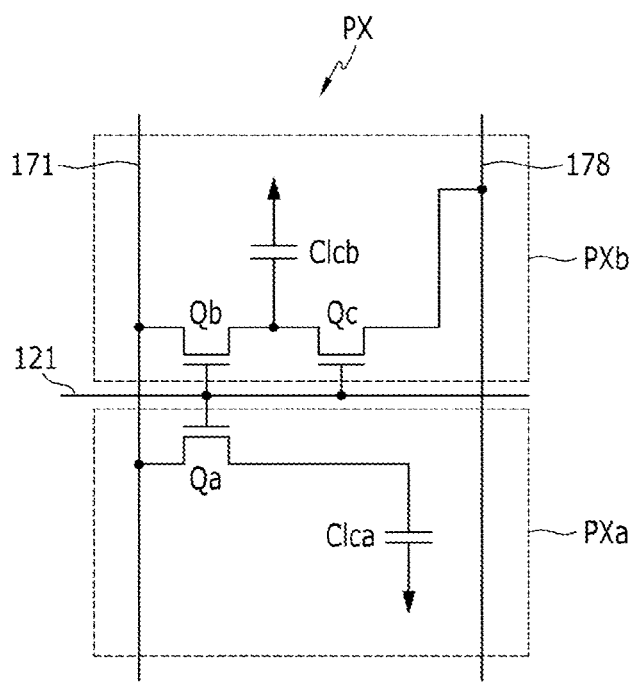
FIG. 13 is an equivalent circuit diagram of one pixel of a liquid crystal display according to an exemplary embodiment of the present invention.
Figure 14:
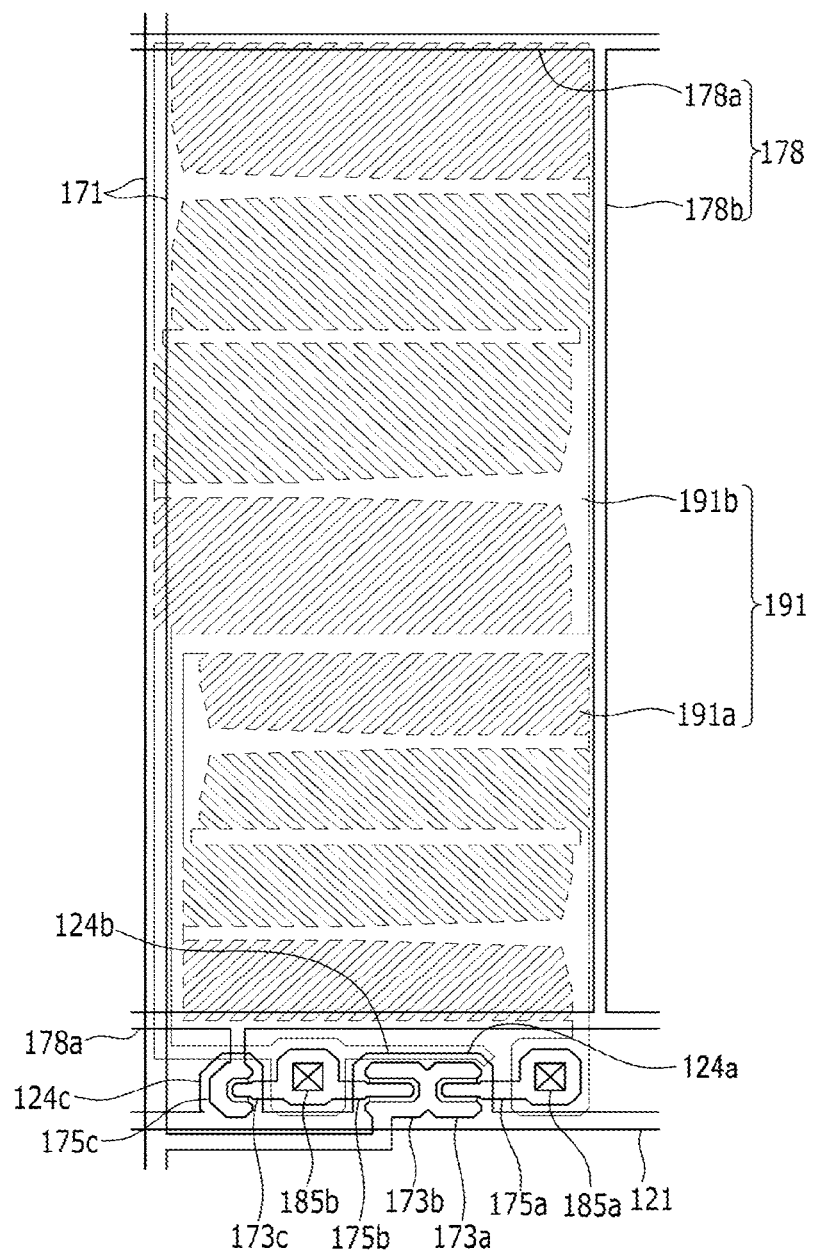
FIGS. 14 and 15 are layout views of one pixel of the liquid crystal display according to the exemplary embodiment of the present invention, respectively.
Figure 15:
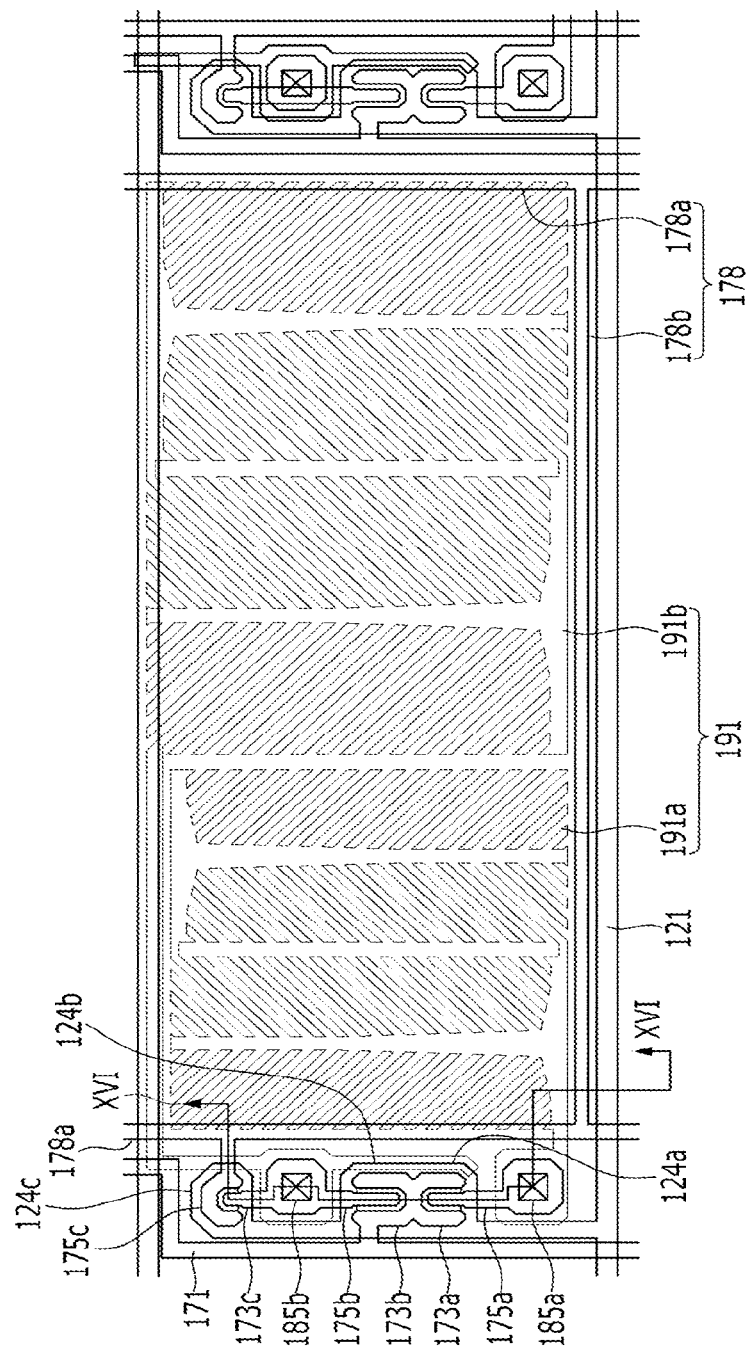
Figure 16:
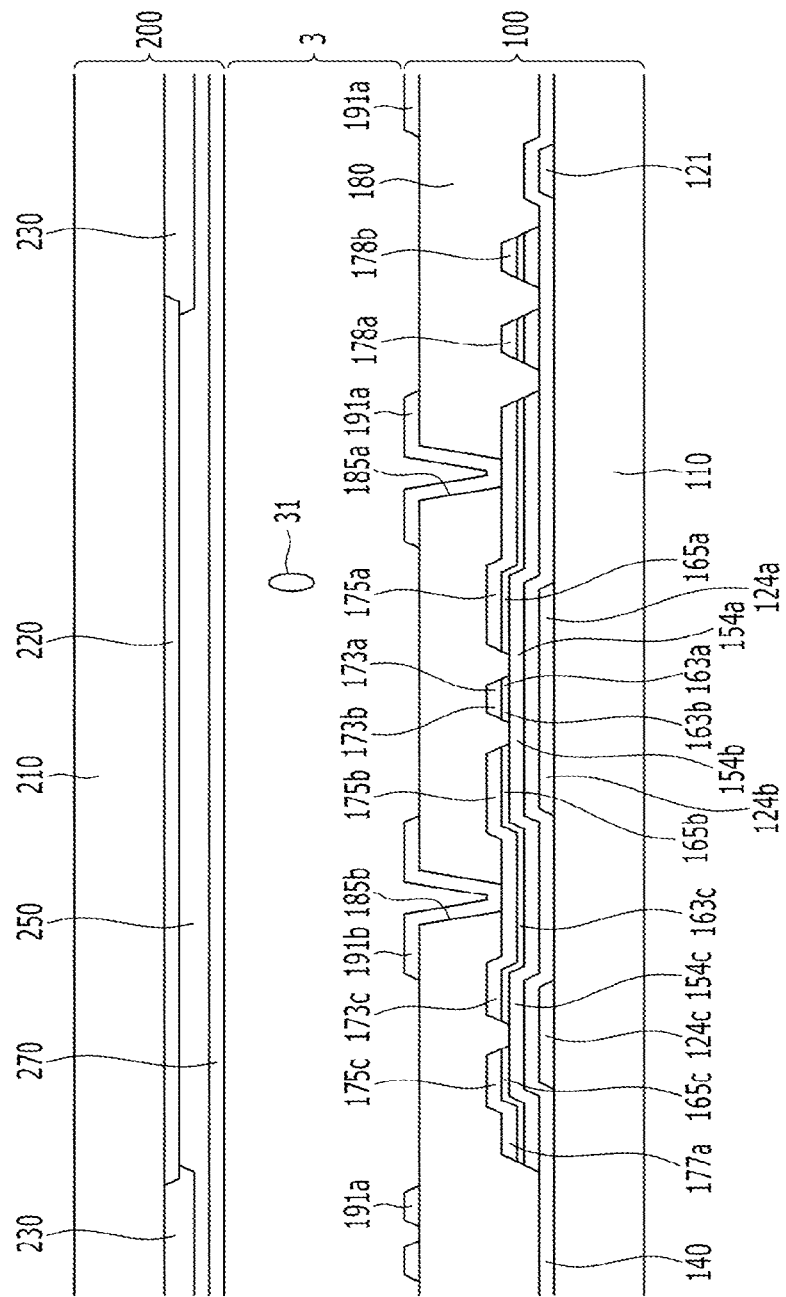
FIG. 16 is a cross-sectional view of the liquid crystal display of FIG. 15 taken along line XVI-XVI.

FIG. 13 is an equivalent circuit diagram of one pixel of a liquid crystal display according to an exemplary embodiment of the present invention, FIGS. 14 and 15 are layout views of one pixel of the liquid crystal display according to the exemplary embodiment of the present invention, and FIG. 16 is a cross-sectional view of the liquid crystal display of FIG. 15 taken along line XVI-XVI.

Referring to FIG. 13, the liquid crystal display according to this exemplary embodiment of the present invention may include signal lines including a gate line 121, a data line 171, a reference voltage line 178 transferring a reference voltage, and the like, as well as a pixel PX connected thereto.

Each pixel PX includes first and second subpixels PXa and PXb. The first subpixel PXa includes a first switching element Qa and a first liquid crystal capacitor Clca, while the second subpixel PXb includes second and third switching elements Qb and Qc, as well as a second liquid crystal capacitor Clcb. The first switching element Qa and the second switching element Qb are each connected to the gate line 121 and the data line 171, while the third switching element Qc is connected to an output terminal of the second switching element Qb and the reference voltage line 178. An output terminal of the first switching element Qa is connected to the first liquid crystal capacitor Clca, and an output terminal of the second switching element Qb is connected to both the second liquid crystal capacitor Clcb and the third switching element Qc. A control terminal of the third switching element Qc is connected to the gate line 121, an input terminal is connected to the second liquid crystal capacitor Clcb, and an output terminal is connected to the reference voltage line 178.

In an operation of the pixel PX illustrated in FIG. 13, first, when a gate-on voltage Von is applied to the gate line 121, the first switching element Qa, the second switching element Qb, and the third switching element Qc which are connected to the gate line 121 are turned on. Accordingly, the data voltage applied to the data line 171 is applied to the first liquid crystal capacitor Clca and the second liquid crystal capacitor Clcb through the turned-on first switching element Qa and second switching element Qb, respectively. As a result, the first liquid crystal capacitor Clca and the second liquid crystal capacitor Clcb are charged by a difference between the data voltage and the common voltage Vcom. In this case, the same data voltage is transferred to the first liquid crystal capacitor Clca and the second liquid crystal capacitor Clcb through the first and second switching elements Qa and Qb, but the charging voltage of the second liquid crystal capacitor Clcb is divided through the third switching element Qc. Accordingly, since the charging voltage of the second liquid crystal capacitor Clcb is lower than the charging voltage of the first liquid crystal capacitor Clca, the luminances of the two subpixels PXa and PXb may be different from each other, and thereby, the lateral gamma curve and the front gamma curve may be adjusted to substantially coincide with each other. Therefore, when the voltage charged in the first liquid crystal capacitor Clca and the voltage charged in the second liquid crystal capacitor Clcb are appropriately controlled, an image viewed from the side may be maximally close to an image viewed from the front, thereby improving side visibility.

FIGS. 14 to 16 illustrate an example of the liquid crystal display according to the exemplary embodiment of the present invention having the circuit structure illustrated in FIG. 13.

The liquid crystal display according to this exemplary embodiment includes a lower panel 100 and an upper panel 200 facing each other, and a liquid crystal layer 3 interposed between the two panels 100 and 200.

FIG. 14 illustrates an exemplary embodiment in which the first subpixel PXa and the second subpixel PXb are adjacent to each other in a vertical direction (in the view of FIG. 14), as an example in which a length of one pixel PX in a vertical direction is larger than a length thereof in a horizontal direction. FIG. 15 illustrates an exemplary embodiment in which the first subpixel PXa and the second subpixel PXb are adjacent to each other in a horizontal direction, as an example in which a length of one pixel PX in a horizontal direction is larger than a length thereof in a vertical direction.

In the lower panel 100, a gate line 121 is positioned on an insulation substrate 110, where the gate line 121 includes a first gate electrode 124a, a second gate electrode 124b, and a third gate electrode 124c, and extends in a horizontal direction. A gate insulating layer 140 is positioned on the gate line 121, and a first semiconductor 154a, a second semiconductor 154b, and a third semiconductor 154c are positioned thereon. A plurality of ohmic contacts 163a, 165a, 163b, 165b, 163c, and 165c may be positioned on the first semiconductor 154a, the second semiconductor 154b, and the third semiconductor 154c. A data conductor including a data line 171 (the data line including a first source electrode 173a and a second source electrode 173b) extending in a vertical direction, a first drain electrode 175a, a second drain electrode 175b, a third source electrode 173c, a third drain electrode 175c and a reference voltage line 178 are positioned on the ohmic contact and the gate insulating layer 140. The reference voltage line 178 may include two stems 178a which are mostly perpendicular to the data line 171, and a connection part 178b connecting the two stems 178a. A delay of a signal flowing in the reference voltage line 178 may be prevented by connecting the two stems 178a of the reference voltage line 178 by the connection part 178b. However, a shape of the reference voltage line 178 is not limited thereto but may be any other shape.

The first gate electrode 124a, the first source electrode 173a and the first drain electrode 175a form a first thin film transistor Qa together with the first semiconductor 154a. The second gate electrode 124b, the second source electrode 173b and the second drain electrode 175b form a second thin film transistor Qb together with the second semiconductor 154b, and the third gate electrode 124c, the third source electrode 173c and the third drain electrode 175c form the third thin film transistor Qc together with the third semiconductor 154c.

The lower electrode 191, including the first subpixel electrode 191a and the second subpixel electrode 191b, is positioned on the passivation layer 180. Each of the first subpixel electrode 191a and the second subpixel electrode 191b may have the same structure as any one of the lower electrodes 191 according to the exemplary embodiments described above. FIGS. 14 and 15 illustrate an example in which each of the first subpixel electrode 191a and the second subpixel electrode 191b has the same structure as the lower electrode 191 according to the exemplary embodiment illustrated in FIGS. 1 and 2 described above.

The first subpixel electrode 191a and the second subpixel electrode 191b are physically and electrically connected to the first drain electrode 175a and the second drain electrode 175b through the contact holes 185a and 185b, respectively, and may receive data voltages from the first drain electrode 175a and the second drain electrode 175b. In this case, a part of the data voltage applied to the second drain electrode 175b is divided through the third source electrode 173c and as a result, a magnitude of the voltage applied to the second subpixel electrode 191b may be smaller than a magnitude of the voltage applied to the first subpixel electrode 191a.

Figure 17:
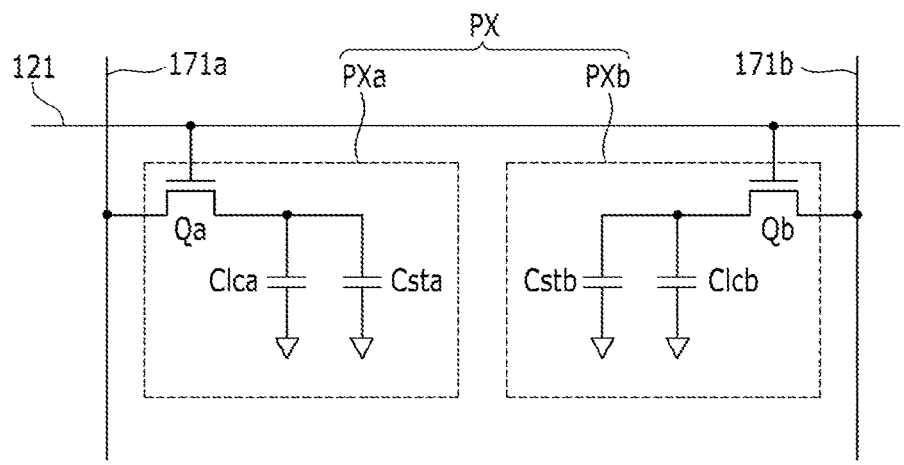
FIGS. 17 to 19 are equivalent circuit diagrams of one pixel of a liquid crystal display according to an exemplary embodiment of the present invention.
Figure 18:
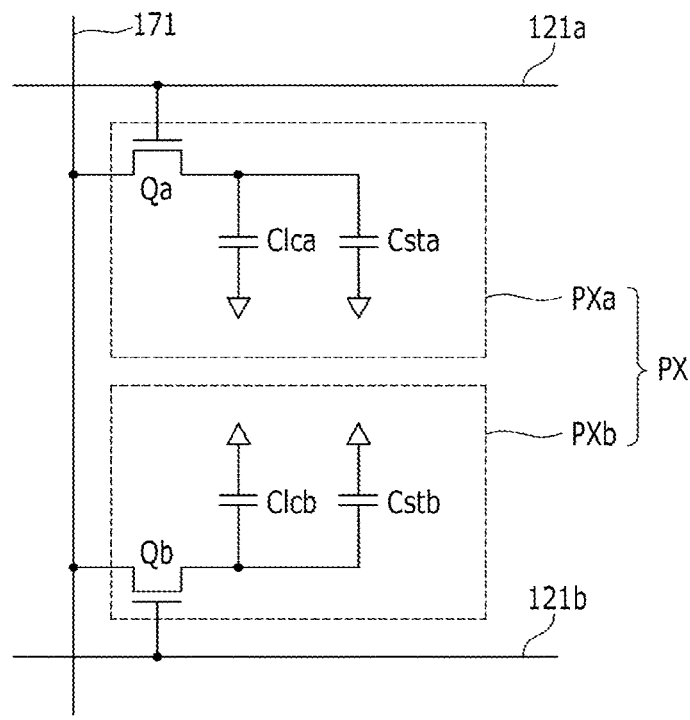
Figure 19:
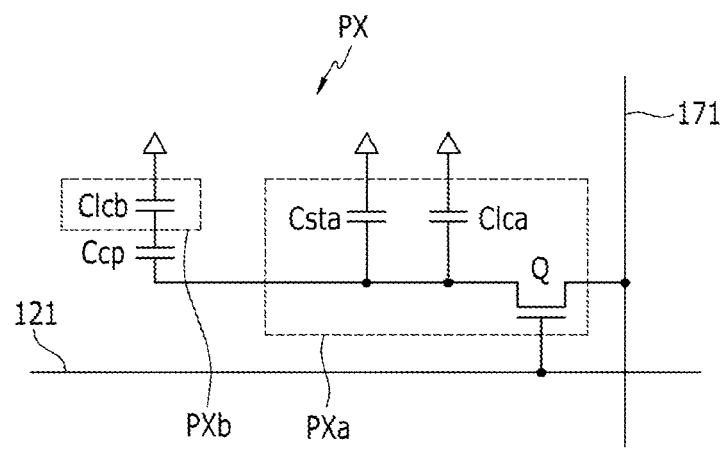

FIGS. 17 to 19 are equivalent circuit diagrams of one pixel of a liquid crystal display according to an exemplary embodiment of the present invention. FIGS. 17, 18, and 19 illustrate various circuit structures of the pixel PX in addition to the above exemplary embodiment, as equivalent circuit diagrams of one pixel of the liquid crystal display according to exemplary embodiments of the present invention.

First, referring to FIG. 17, the liquid crystal display according to the exemplary embodiment of the present invention may include signal lines including first and second data lines 171a and 171b, and a gate line 121, as well as a pixel PX connected thereto. The first subpixel PXa of each pixel PX includes a first switching element Qa, a first liquid crystal capacitor Clca, and a first storage capacitor Csta, while the second subpixel PXb includes a second switching element Qb, a second liquid crystal capacitor Clcb, and a second storage capacitor Cstb. The first switching element Qa includes a control terminal connected to the gate line 121, and an input terminal connected to the first data line 171a. An output terminal of the first switching element Qa is connected to the first liquid crystal capacitor Clca and the first storage capacitor Csta. The second switching element Qb includes a control terminal connected to the gate line 121, and an input terminal connected to the second data line 171b. An output terminal of the second switching element Qb is connected to the second liquid crystal capacitor Clcb and the second storage capacitor Cstb. The first liquid crystal capacitor Clca and the second liquid crystal capacitor Clcb may receive different data voltages with respect to one input image signal IDAT through the first and second switching elements Qa and Qb which are connected to the different data lines 171a and 171b.

Next, referring to FIG. 18, the liquid crystal display according to this exemplary embodiment of the present invention may include signal lines including a data line 171 and first and second gate lines 121a and 121b, as well as a pixel PX connected thereto. The first switching element Qa included in the first subpixel PXa of each pixel PX includes a control terminal connected to the first gate line 121a and an input terminal connected to the data line 171. An output terminal of the first switching element Qa is connected to the first liquid crystal capacitor Clca and the first storage capacitor Csta. The second switching element Qb of the second subpixel PXb includes a control terminal connected to the second gate line 121b, and an input terminal connected to the data line 171. An output terminal of the second switching element Qb is connected to the second liquid crystal capacitor Clcb and the second storage capacitor Cstb. The first liquid crystal capacitor Clca and the second liquid crystal capacitor Clcb may receive different data voltages with respect to one input image signal IDAT transferred by the data line 171 at different times through the first and second switching elements Qa and Qb which are connected to the different gate lines 121a and 121b.

Next, referring to FIG. 19, the liquid crystal display according to the exemplary embodiment of the present invention may include signal lines including a data line 171 and a gate line 121, as well as a pixel PX connected thereto. Each pixel PX may include first and second subpixels PXa and PXb, and a coupling capacitor Ccp connected between the two subpixels PXa and PXb. The first subpixel PXa includes a switching element Q connected to the gate line 121 and the data line 171, a first liquid crystal capacitor Clca connected to the switching element Q, and a first storage capacitor Csta. The second subpixel PXb includes a second liquid crystal capacitor Clcb connected to the coupling capacitor Ccp. A control terminal of the switching element Q is connected to the gate line 121, an input terminal thereof is connected to the data line 171, and an output terminal thereof is connected to the first liquid crystal capacitor Clca, the first storage capacitor Csta, and the coupling capacitor Ccp. The switching element Q transfers a data voltage of the data line 171 to the first liquid crystal capacitor Clca and coupling capacitor Ccp according to a gate signal from the gate line 121, and the coupling capacitor Ccp may change a magnitude of the voltage to transfer the changed voltage to the second liquid crystal capacitor Clcb. A charged voltage of the second liquid crystal capacitor Clcb may be always lower than a charged voltage of the first liquid crystal capacitor Clca by the coupling capacitor Ccp. Accordingly, by appropriately controlling capacitance of the coupling capacitor Ccp, a ratio of the charged voltage of the first liquid crystal capacitor Clca to the charged voltage of the second liquid crystal capacitor Clcb is controlled, thereby making the lateral gamma curve and the front gamma curve substantially coincide with each other and improving side visibility.

In the liquid crystal displays according to the exemplary embodiments, a first subpixel electrode which is a terminal of the first liquid crystal capacitor Clca and a second subpixel electrode which is a terminal of the second liquid crystal capacitor Clcb may also have the same shape as the lower electrodes 191 according to various embodiments described above and the same effects according to the shape.

In addition, the structure of the lower electrode 191 according to the exemplary embodiment described above can be applied to liquid crystal displays having various structures, thereby reducing a texture around the horizontal stems or the vertical stems and increasing transmittance.

Next, a liquid crystal display according to an exemplary embodiment of the present invention will be described with reference to FIG. 20.

Figure 20:
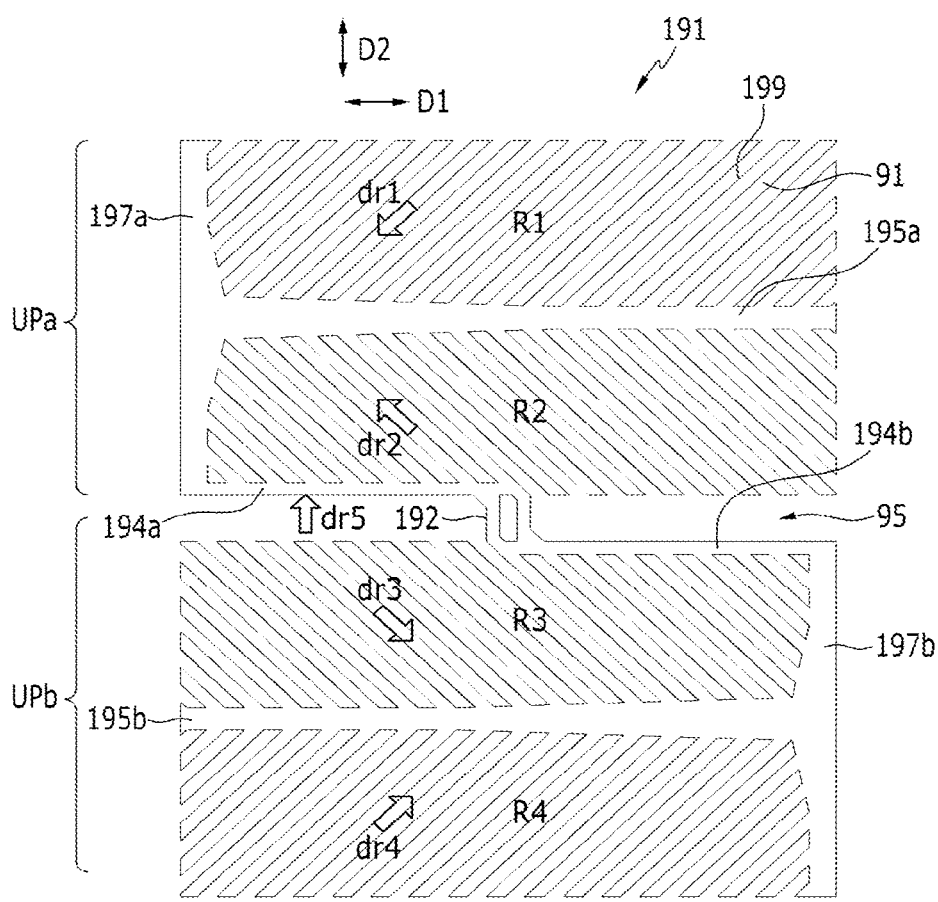
FIG. 20 is a plan view of a lower electrode of a liquid crystal display according to an exemplary embodiment of the present invention.

FIG. 20 is a plan view of a lower electrode of a liquid crystal display according to an exemplary embodiment of the present invention.

Referring to FIG. 20, the liquid crystal display according to this exemplary embodiment may include a lower electrode 191 which has a similar structure to that of one or more of the embodiments described above. Unlike the exemplary embodiment described above, a width of portions of at least one of the horizontal stems 195a and 195b and the vertical stems 197a and 197b of the lower electrode 191 may be constant along their length. According to the exemplary embodiment of the present invention, ends of at least some of a plurality of minute branches 199 adjacent to a gap 95 may be connected to each other by linear connection parts 194a and 194b.

In detail, some of the ends of the minute branches 199 of two subregions R2 and R3 are connected to each other by the connection parts 194a and 194b.

Not all of these branches 199 need be connected to each other. For example, as illustrated in FIG. 20, when the ends of the minute branches 199 of a left side of the subregion R2 of an upper unit electrode UPa are connected to each other by the connection part 194a, the ends of the minute branches 199 of a left side of the subregion R3 of a lower unit electrode UPb may not be connected to each other. Similarly, when the ends of the minute branches 199 of a right side of the subregion R3 of the lower unit electrode UPb are connected to each other by the connection part 194b, the ends of the minute branches 199 of a right side of the subregion R2 of the upper unit electrode UPa may not be connected to each other.

As such, when the connection parts 194a and 194b connecting the ends of the minute branches 199 are formed along only parts of the two subregions R2 and R3 facing each other with the gap 95 therebetween, as illustrated in FIG. 20, the liquid crystal molecules 31 at a place corresponding to the gap 95 are tilted toward sides of the connection parts 194a and 194b in a fifth direction dr5 (perpendicular to the major axes of connection parts 194a and 194b), by a fringe field generated by the sides of the connection parts 194a and 194b. Accordingly, since two directions of the control ability that affects the liquid crystal molecules 31 corresponding to the gap 95 form an angle smaller than about 180 degree, for example, about 135 degrees as shown by the difference between the third direction dr3 and the fifth direction dr5 illustrated in FIG. 20, behavior directions of the liquid crystal molecules 31 corresponding to the gap 95 are not in disorder but may have directivity, thereby increasing a liquid crystal control ability around the gap 95. As a result, a texture in images near the gap 95 between the two adjacent subregions R2 and R3 of the lower electrode 191 may be reduced, and transmittance may be increased.

Without the connection parts 194a and 194b, it can be seen by one of ordinary skill in the art that control ability occurs along two axes which are about 180 degrees apart from each other, such as the second direction dr2 and the third direction dr3 illustrated in FIG. 20. The behavior directions thus effectively cancel each other out, leaving the liquid crystal molecules 31 not determined but in disorder. The resulting disorderly arrangement of liquid crystal molecules 31 causes textures to appear in the corresponding images, reducing image quality.

Lengths and the number of connection parts 194a and 194b in each of the two subregions 194a and 194b are not limited to those illustrated in FIG. 20, but may be freely determined. For example, the lengths of the connection parts 194a and 194b may correspond to approximately 1/n (n being a natural number of 2 or more) of the lengths of the subregions R2 and R3, and the number of connection parts 194a and 194b formed in each of the subregions R2 and R3 may be one or more. The connection parts 194a and 194b do not overlap each other, i.e. if part 194a is formed along one length of subregion R2, part 194b need not be formed along the corresponding length of subregion R3. In the view of FIG. 20, part 194a is formed along the leftmost half of subregion R2, and therefore part 195a need not be formed along the leftmost half of subregion R3, but is instead formed along the rightmost half.

The connection parts 194a and 194b of the lower electrode 191 according to the exemplary embodiment may serve as a field shielding part which shields electric fields in the two subregions R2 and R3 facing each other with the gap 95 therebetween.

The connection part 192 connecting the upper unit electrode UPa and the lower unit electrode UPb may be positioned at left and right edges of the lower electrode 191 like another exemplary embodiment described above, or alternatively may be positioned at the center of the lower electrode 191 as illustrated in FIG. 20. Embodiments of the present invention contemplate any suitable placement for connection part 192, at any position along the unit electrodes UPa, UPb.

An example of the liquid crystal display including the lower electrode 191 according to the exemplary embodiment illustrated in FIG. 20 will next be described with reference to FIGS. 21, 22a and 22b in addition to the drawings described above.

Figure 21:
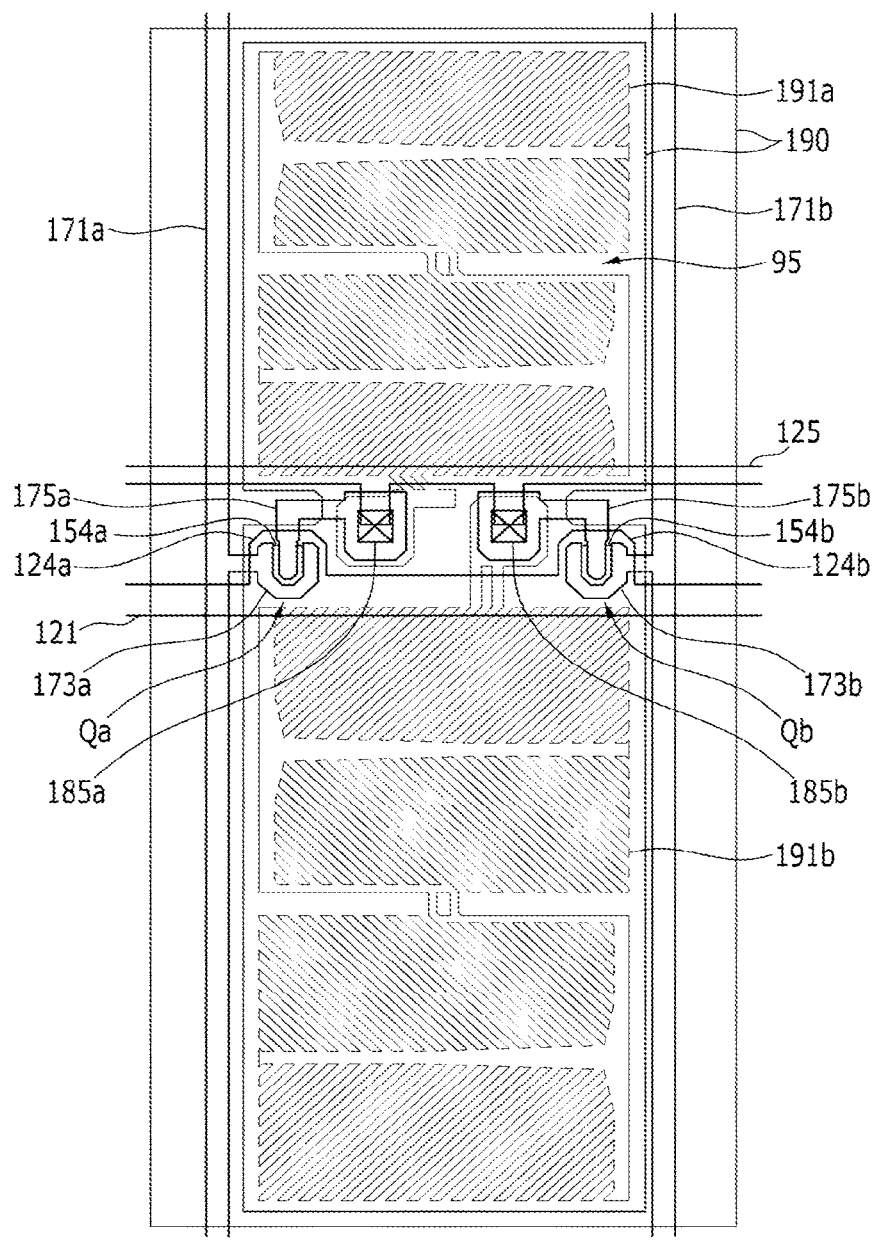
FIG. 21 is a layout view of one pixel of a liquid crystal display according to an exemplary embodiment of the present invention.
Figure 22A:
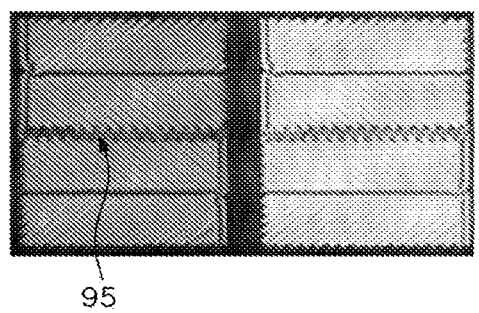
FIGS. 22a and 22b are photographs illustrating luminance displayed by a part of one pixel of a conventional liquid crystal display and one constructed according to an exemplary embodiment of the present invention, respectively.
Figure 22B:
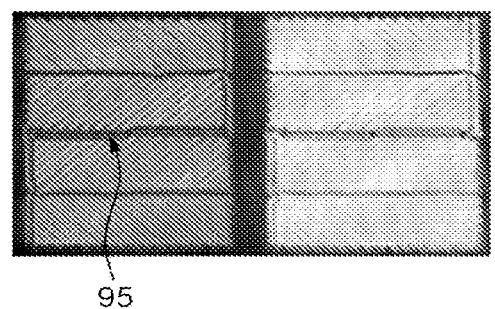

FIG. 21 is a layout view of one pixel of a liquid crystal display according to an exemplary embodiment of the present invention, FIG. 22a is a photograph illustrating luminance displayed by a part of one pixel of a conventional liquid crystal display, and FIG. 22b is a photograph illustrating the corresponding luminance of part of a pixel of a display constructed according to an exemplary embodiment of the present invention.

Referring to FIG. 21, the liquid crystal display according to the exemplary embodiment may have a structure according to an equivalent circuit diagram of the pixel illustrated in FIG. 17 described above.

The liquid crystal display according to the exemplary embodiment includes a lower panel (not illustrated) and an upper panel (not illustrated) facing each other, and a liquid crystal layer (not illustrated) interposed between the two panels.

In the lower panel, a gate line 121 which includes a first gate electrode 124a and a second gate electrode 124b and extends in a horizontal direction is positioned on an insulation substrate. A gate insulating layer (not illustrated) is positioned on the gate line 121, and a first semiconductor 154a and a second semiconductor 154b are positioned thereon. A first data line 171a and a second data line 171b which extend in a vertical direction are positioned on the first semiconductor 154a and the second semiconductor 154b, and the gate insulating layer. The first data line 171a includes a first source electrode 173a connected to the first semiconductor 154a, and the second data line 171b includes a second source electrode 173b connected to the second semiconductor 154b.

The first gate electrode 124a, the first source electrode 173a, and the first drain electrode 175a collectively form a first thin film transistor Qa together with the first semiconductor 154a, and the second gate electrode 124b, the second source electrode 173b, and the second drain electrode 175b collectively form a second thin film transistor Qb together with the second semiconductor 154b.

A passivation layer 180 is positioned on the first and second data lines 171a and 171b. The passivation layer 180 may include contact holes 185a and 185b exposing the first drain electrode 175a and the second drain electrode 175b, respectively.

A first subpixel electrode 191a and a second subpixel electrode 191b, as well as a shielding electrode 190 are positioned on the passivation layer 180.

Each of the first subpixel electrode 191a and the second subpixel electrode 191b may have the same structure as any one of the lower electrodes 191 according to the exemplary embodiments described above. FIG. 21 illustrates an example in which each of the first subpixel electrode 191a and the second subpixel electrode 191b has the same structure as the lower electrode 191 according to the exemplary embodiment illustrated in FIG. 20 described above.

The shielding electrode 190 surrounds the first and second subpixel electrodes 191a and 191b and includes an opening defining a pixel area. The shielding electrode 190 may be made of the same material and on the same layer as the first and second subpixel electrodes 191a and 191b, and may transfer a common voltage. The shielding electrode 190 includes a portion overlapping the first and second data lines 171a and 171b. The shielding electrode 190 shields an electric field generated by an adjacent pixel PX or an electric field generated by the first and second data lines 171a and 171b, to prevent a crosstalk and to prevent light leakage around the pixel PX.

Since other structures of the liquid crystal display are the same as those of the exemplary embodiments described above, herein, a detailed description is omitted.

Referring to FIGS. 17 and 21 described above, the first subpixel electrode 191a and the upper electrode (not illustrated) of the upper panel form a first liquid crystal capacitor Clca together with the liquid crystal layer (not illustrated) therebetween, and the second subpixel electrode 191b and the upper electrode form a second liquid crystal capacitor Clcb together with the liquid crystal layer therebetween. As a result, even after the first and second thin film transistors Qa and Qb are turned off, the applied voltage is maintained for some time.

Further, the liquid crystal display according to the exemplary embodiment of the present invention may further include a storage electrode line 125 which overlaps the first and second subpixel electrodes 191a and 191b or the first and second drain electrodes 175a and 175b to form the first and second storage capacitors Csta and Cstb. The storage electrode line 125 transfers a predetermined voltage, such as a common voltage Vcom. The storage electrode line 125 may be positioned on the same layer as the gate line 121.

Referring to FIGS. 22a and 22b, images having various grays may be displayed by applying data voltages to the first and second subpixel electrodes 191a and 191b, respectively, of the liquid crystal display according to the exemplary embodiment of the present invention. In the case where the first and second subpixel electrodes 191a and 191b do not include the connection parts 194a and 194b, as illustrated in FIG. 22a, the directions of the liquid crystal molecules 31 around the gap 95 are not well controlled, and a disorderly texture region is produced. However, employing the exemplary embodiment illustrated in FIG. 20 or 21, as illustrated in FIG. 22b, it may be verified that a texture is reduced around the gap 95.

Next, a liquid crystal display according to an exemplary embodiment of the present invention will be described with reference to FIGS. 23, 24a and 24b together with the drawings described above. The same constituent elements as described above designate the same reference numerals, and duplicated description is thus omitted.

Figure 23:
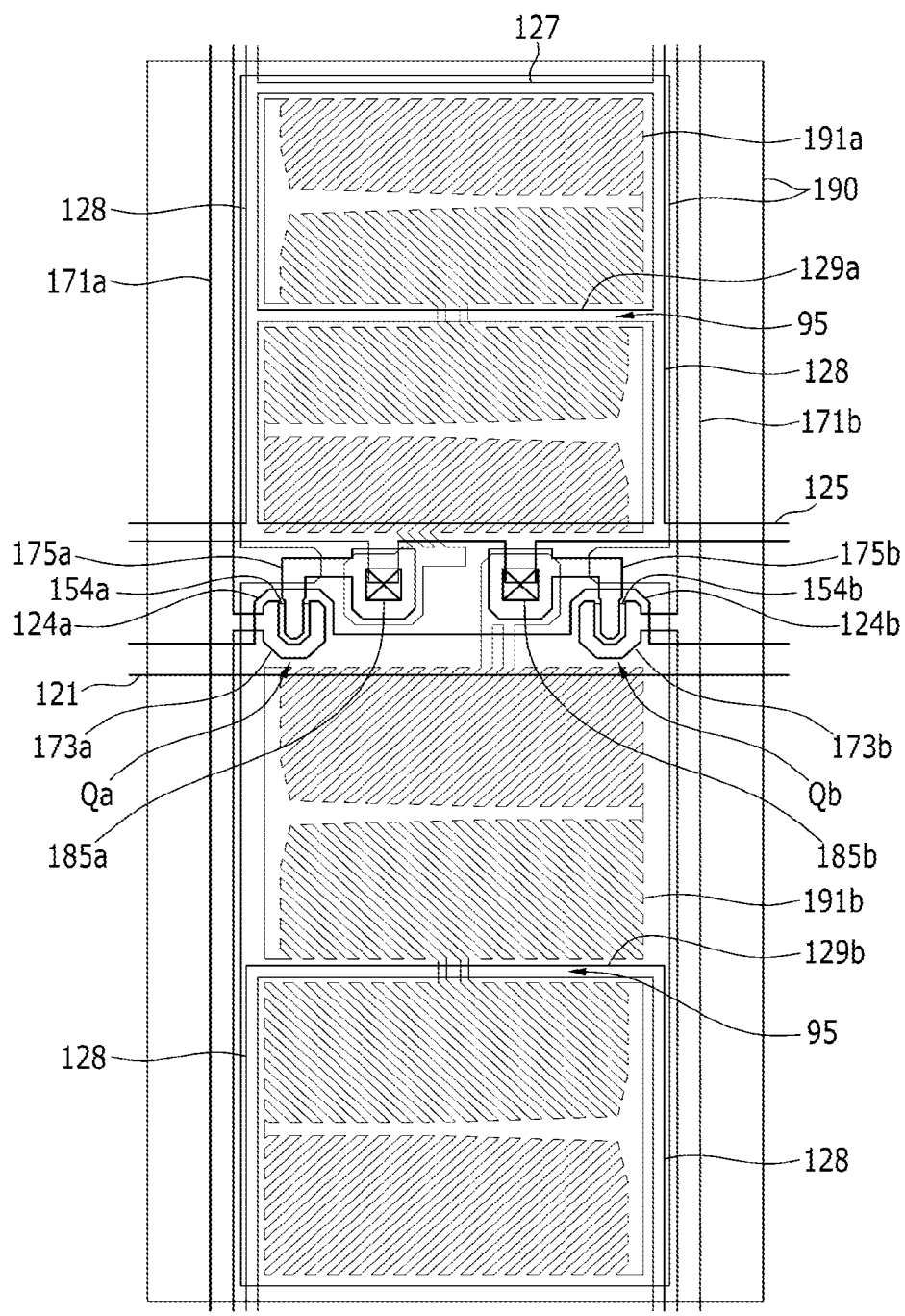
FIG. 23 is a layout view of one pixel of a liquid crystal display according to an exemplary embodiment of the present invention.

FIG. 23 is a layout view of one pixel of the liquid crystal display according to another exemplary embodiment of the present invention, and FIGS. 24a and 24b are photographs illustrating luminance displayed by, respectively, a part of one pixel of a conventional liquid crystal display and one constructed according to an exemplary embodiment of the present invention.

Referring to FIG. 23, the liquid crystal display according to this exemplary embodiment is similar to those of the exemplary embodiments described above, but the storage electrode line 125 may have a different structure.

In detail, the storage electrode line 125 according to this exemplary embodiment may include horizontal portions 129a and 129b which overlap the gaps 95 of the first subpixel electrode 191a and/or the second subpixel electrode 191b. In this case, the connection parts 194a and 194b of the first and second subpixel electrodes 191a and 191b may be omitted. Further, the storage electrode line 125 may further include a pair of vertical portions 128 extending upward (in the view of FIG. 23) to be substantially perpendicular to the gate line 121, and a horizontal portion 127 connecting the pair of vertical portions 128, but the structure of the storage electrode line 125 is not limited thereto. The horizontal portions 129a and 129b of the storage electrode line 125 may connect the pair of adjacent vertical portions 128.

The horizontal portions 129a and 129b of the storage electrode line 125 shield the electric field between the upper unit electrode UPa and the lower unit electrode UPb which are adjacent to each other with the gap 95 therebetween, so as to prevent the above-described situation in which two liquid crystal control abilities have opposite directions to each other around the gap 95. This reduces undesired textures in images. Further, in the case where the storage electrode line 125 is opaque, textures which may occur around the gap 95 may be covered.

Accordingly, the horizontal portions 129a and 129b of the storage electrode line 125 according to this exemplary embodiment may serve as a field shielding part which shields electric fields in the gap 95 between two subregions R2 and R3.

Referring to FIGS. 24a and 24b, in the case where the first and second subpixel electrodes 191a and 191b of the liquid crystal display according to this exemplary embodiment of the present invention do not include the connection parts 194a and 194b and do not include the horizontal portions 129a and 129b of the storage electrode line 125, as illustrated in FIG. 24a, the directions of the liquid crystal molecules 31 are not well controlled around the gap 95, and a disorderly texture region is formed. However, according to this exemplary embodiment of the present invention, as illustrated in FIG. 24b, it may be verified that the texture around the gap 95 is reduced or not perceived.

Finally, a liquid crystal display according to an exemplary embodiment of the present invention will be described with reference to FIG. 25 together with the drawings described above.

Figure 25:
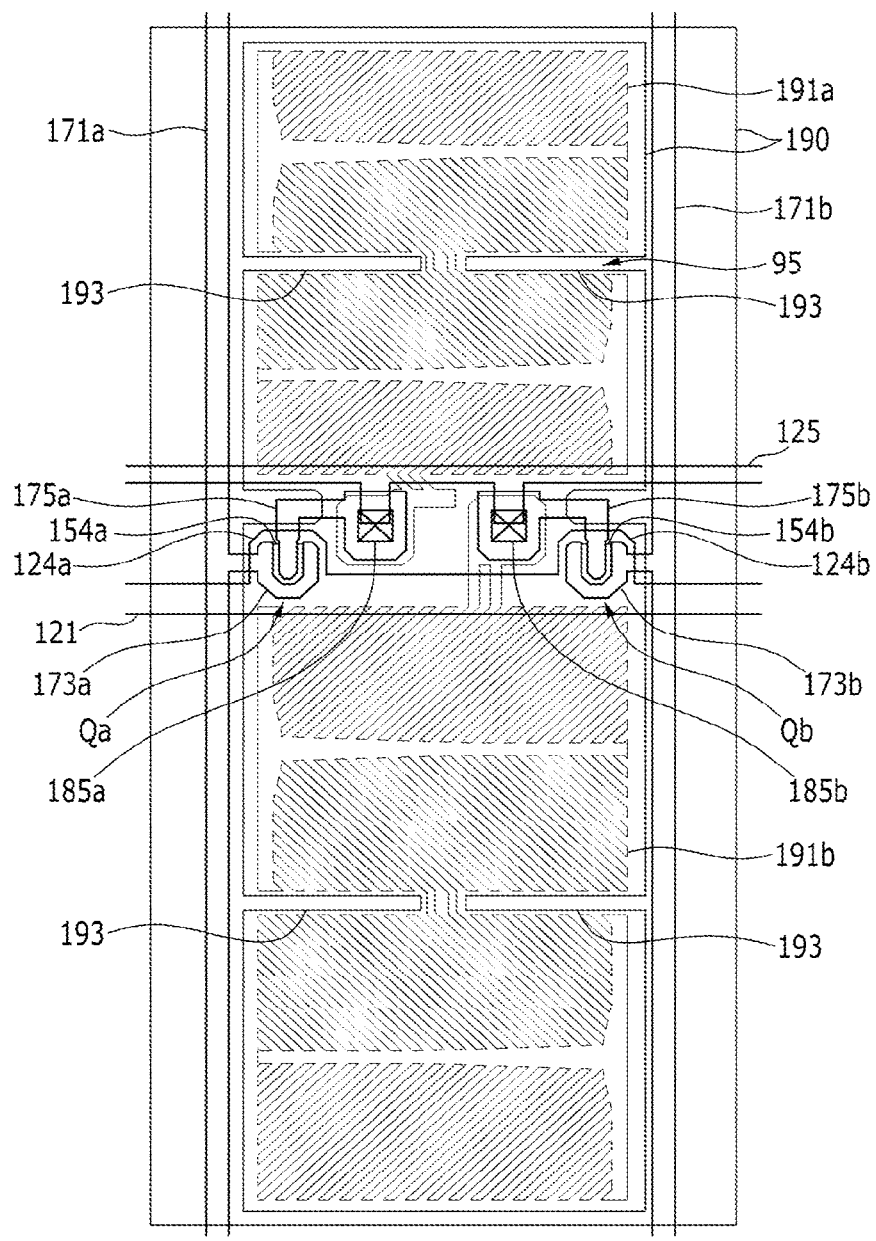
FIG. 25 is a layout view of one pixel of a liquid crystal display according to an exemplary embodiment of the present invention.

FIG. 25 is a layout view of a liquid crystal display according to a further exemplary embodiment of the present invention.

Referring to FIG. 25, the structure of the liquid crystal display according to the exemplary embodiment is similar to those of the exemplary embodiments described above, but a structure of the shielding electrode 190 may be different.

In detail, the shielding electrode 190 according to the exemplary embodiment may include a horizontal portion 193 which at least partially overlap the gaps 95 of the first subpixel electrode 191a and/or the second subpixel electrode 191b. In this case, the connection parts 194a and 194b of the first and second subpixel electrodes 191a and 191b or the horizontal portions 129a and 129b of the storage electrode line 125 according to the exemplary embodiment described above may be omitted. The horizontal portions 193 do not extend across the entire width of either subpixel electrode 191a, 191b, leaving a portion uncovered. In this case, the uncovered portion corresponds to connections (such as connection parts 192) between the upper and lower unit electrodes UPa, UPb.

The horizontal portion 193 of the shielding electrode 190 shields the electric field between the upper unit electrode UPa and the lower unit electrode UPb in the gaps 95, thus preventing the above-described situation in which liquid crystal control abilities oriented opposite directions result in loss of control of liquid crystal orientation, with resulting undesired textures. Further, in the case where the storage electrode line 125 is opaque, texture which may occur around the gap 95 may be covered.

Accordingly, the horizontal portion 193 of the shielding electrode 190 according to this exemplary embodiment may serve as a field shielding part which shields electric fields in the gaps 95.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 3: Liquid crystal layer | 31: Liquid crystal molecule |
| 95: Gap | 100, 200: Panel |
| 121: Gate line | 124: Gate electrode |
| 125: Storage electrode line | |
| 140: Gate insulating layer | 171: Data line |
| 173: Source electrode | 175: Drain electrode |
| 180, 180p, 180q: Passivation layer | 191: Lower electrode |
| 191a: First subpixel electrode | 191b: Second subpixel electrode |
| 195a, 195b: Horizontal stem | 197a, 197b: Vertical stem |
| 199: Minute branch | 192: Connection part |
| 220: Light blocking member | 230: Color filter |
| 250: Overcoat | 270: Upper electrode |

What is claimed is:

1. A liquid crystal display, comprising:
a gate line extending in a first direction;
a data line crossing the gate line and extending in a second direction;
a thin film transistor connected to the gate line and the data line; and
a first electrode connected to the thin film transistor,
wherein the first electrode includes a first portion and a second portion which are adjacent to each other with a gap between the first portion and the second portion;
wherein the first portion includes:
a first subregion including first branches;
a second subregion including second branches;
a first stem extending in a first direction and between the first subregion and the second subregion; and
a second stem extending in a second direction crossing the first direction, connected to the first stem, and defining an edge of the first portion;
wherein the second portion includes:
a third subregion including third branches;
a fourth subregion including fourth branches;
a third stem extending in the first direction and between the third subregion and the fourth subregion; and
a fourth stem extending in the second direction, connected to the third stem, and defining an edge of the second portion; and
wherein the first electrode further includes a connector disposed between the first portion and the second portion, a first end of the connector is connected to an end of a portion of the second branches facing the gap, a second end of the connector is connected to an end of a portion of the third branches facing the gap, and the second branches and the third branches extend obliquely with respect to the first direction and the second direction.

2. The liquid crystal display of claim 1, further comprising:
a second electrode; and
a liquid crystal layer interposed between the first electrode and the second electrode.

3. The liquid crystal display of claim 1, further comprising:
a first connection part extending in the first direction and connecting end portions of a portion of the second branches.

4. The liquid crystal display of claim 3, further comprising:
a second connection part extending in the first direction and connecting end portions of a portion of the third branches.

5. The liquid crystal display of claim 4, wherein:
the first connection part is adjacent to the gap, and
end portions of the third branches that face the first connection part are separated from each other.

6. The liquid crystal display of claim 5, wherein:
the first connection part is connected to the second stem and the connector, and
the first connection part extends from the second stem to the connector.

7. The liquid crystal display of claim 6, wherein:
the second connection part is adjacent to the gap, and
end portions of the second branches that face the second connection part are separated from each other.

8. The liquid crystal display of claim 7, wherein:
the second connection part is connected to the fourth stem and the connector, and
the second connection part extends from the fourth stem to the connector.

9. The liquid crystal display of claim 5, wherein:
a length of the first connection part in the first direction is less than a length of the first portion in the first direction.

10. The liquid crystal display of claim 9, wherein:
the first connection part defines an edge of the first portion adjacent to the gap.

11. The liquid crystal display of claim 10, wherein:
a length of the second connection part in the first direction is less than a length of the second portion in the first direction.

12. The liquid crystal display of claim 11, wherein:
the second connection part defines an edge of the second portion adjacent to the gap.

13. The liquid crystal display of claim 12, wherein:
the first branches and the fourth branches extend obliquely with respect to the first direction and the second direction.

14. The liquid crystal display of claim 4, wherein:
the connector is connected to an end portion of the first connection part.

15. The liquid crystal display of claim 14, wherein:
the connector is connected to an end portion of the second connection part.

16. The liquid crystal display of claim 4, wherein:
a length of the first connection part in the first direction is substantially half a length of the first portion in the first direction.

17. The liquid crystal display of claim 1, further comprising:
a storage electrode line configured to transmit a common voltage,
wherein the storage electrode line includes a horizontal portion overlapping the gap.

18. The liquid crystal display of claim 17, wherein:
the horizontal portion of the storage electrode line extends in the first direction and overlaps the connector.

19. The liquid crystal display of claim 18, wherein:
the storage electrode line overlaps at least one of the first electrode and an electrode connected to the first electrode, so as to form a storage capacitor.

20. The liquid crystal display of claim 1, further comprising:
a shielding electrode overlapping the data line,
wherein the shielding electrode includes a horizontal portion overlapping the gap.

21. The liquid crystal display of claim 20, wherein:
the horizontal portion of the shielding electrode extends in the first direction.

22. The liquid crystal display of claim 20, wherein:
the shielding electrode substantially surrounds the first electrode.

23. The liquid crystal display of claim 20, wherein:
the shielding electrode is positioned at a same layer as the first electrode and is configured to transmit a common voltage.

* * * * *